United States Patent
Nakahori

(10) Patent No.: US 8,102,161 B2
(45) Date of Patent: *Jan. 24, 2012

(54) STABLE OUTPUT IN A SWITCHING POWER SUPPLY BY SMOOTHING THE OUTPUT OF THE SECONDARY COIL

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 644 days.

This patent is subject to a terminal disclaimer.

(21) Appl. No.: 12/234,274

(22) Filed: Sep. 19, 2008

(65) Prior Publication Data

US 2009/0079402 A1    Mar. 26, 2009

(30) Foreign Application Priority Data

Sep. 25, 2007 (JP) ............... P2007-247781
Aug. 5, 2008 (JP) ............... P2008-202231

(51) Int. Cl.
G05F 1/14 (2006.01)
G05F 3/04 (2006.01)
H02M 7/08 (2006.01)
H02M 7/48 (2006.01)

(52) U.S. Cl. ............ 323/255; 323/312; 363/67; 363/69; 363/71

(58) Field of Classification Search ............... 363/17, 363/21.01, 39–42, 56.01, 67, 71, 69; 323/312
See application file for complete search history.

(56) References Cited

U.S. PATENT DOCUMENTS

| 4,062,057 | A  | * | 12/1977 | Perkins et al. ........... 363/71 |
| 5,351,175 | A  | * | 9/1994  | Blankenship ........... 363/16 |
| 6,281,779 | B1 |   | 8/2001  | Matsumoto et al. |
| 6,362,986 | B1 |   | 3/2002  | Schultz et al. |
| 6,831,845 | B2 | * | 12/2004 | Biebach ........... 363/16 |
| 6,952,353 | B2 |   | 10/2005 | Yan et al. |
| 7,016,203 | B2 |   | 3/2006  | Xu et al. |
| 7,136,293 | B2 |   | 11/2006 | Petkov et al. |
| 7,199,569 | B1 | * | 4/2007  | Nakahori ........... 323/355 |
| 2006/0145800 | A1 | | 7/2006 | Dadafshar et al. |
| 2006/0197510 | A1 | | 9/2006 | Chandrasekaran |
| 2007/0097571 | A1 | | 5/2007 | Dinh et al. |
| 2009/0079402 | A1 | | 3/2009 | Nakahori |
| 2009/0109709 | A1 | | 4/2009 | Nakahori |
| 2010/0182814 | A1 | * | 7/2010 | Tada et al. ........... 363/134 |

FOREIGN PATENT DOCUMENTS

| JP | 3230756      | * 10/1991 |
| JP | A-8-181024   | 7/1996    |
| JP | A-2000-260639| 9/2000    |
| JP | A-2004-22613 | 1/2004    |
| JP | A-2005-86846 | 3/2005    |
| JP | A-2005-86948 | 3/2005    |
| JP | A-2006-14535 | 1/2006    |
| JP | A-2006-20410 | 1/2006    |
| JP | A-2007-104766| 4/2007    |

OTHER PUBLICATIONS

Apr. 25, 2011 Office Action issued in U.S. Appl. No. 12/258,518, 2011.

OTHER PUBLICATIONS

U.S. Appl. No. 12/258,518, 2008.

* cited by examiner

*Primary Examiner* — Jessica Han
*Assistant Examiner* — Gary Nash
(74) *Attorney, Agent, or Firm* — Oliff & Berridge, PLC

(57) ABSTRACT

This switching power supply provides a stable output. In the switching power supply, at least pairs of secondary side coils are connected to each of the center tap rectifier circuits and the secondary side coils of each of the center tap rectifier circuits are disposed in the core portions (cores) of mutually different transformers.

6 Claims, 14 Drawing Sheets

STABLE OUTPUT IN A SWITCHING POWER SUPPLY BY SMOOTHING THE OUTPUT OF THE SECONDARY COIL

BACKGROUND OF THE INVENTION

1. Field of the Invention

The present invention relates to a switching power supply.

2. Related Background Art

A conventional switching power supply appears in Japanese Patent Publication No. 2,629,999, for example. The switching power supply of Japanese Patent Publication No. 2,629,999 has two output transformers connected thereto. In the first output transformer, two primary side coils are disposed with the same polarity on the same magnetic path and one of the primary side coils in the first output transformer and one of the primary side coils in the second output transformer are switched by means of a first driver circuit and the other primary side coil in the first output transformer and the other primary side coil in the second output transformer are switched by means of a second driver circuit, which provides the stability of the switching power supply. The secondary side coil of the transformer is connected to a rectifier circuit and a smoothing circuit, whereby the desired DC voltage is output.

In addition, inventions relating to a parallel drive power supply device by the present applicant appear in Japanese Patent Application Laid Open No. 2006-14535, Japanese Patent Application Laid Open No. 2006-20410, Japanese Patent Application Laid Open No. 2005-086846, and Japanese Patent Application Laid Open No 2005-086948, and these devices achieve superior operations.

However, there have been cases where the output is destabilized, such as a case where the characteristic of the choke coil contained in the smoothing filter varies from product to product.

SUMMARY OF THE INVENTION

The present invention was conceived in view of this problem and an object of the present invention is to provide a switching power supply with a stable output.

In order to solve this problem, the switching power supply according to the first invention is a switching power supply, comprising a plurality of transformers each having a core portion; a plurality of inverter circuits that drive primary side coils of the transformers; a plurality of center tap rectifier circuits connected to secondary side coils of the transformers; and a plurality of smoothing circuits which are established in parallel and connected downstream of the plurality of center tap rectifier circuits, wherein at least pairs of secondary side coils are connected to each of the center tap rectifier circuits, and the secondary side coils of each of the center tap rectifier circuits are disposed in core portions of mutually different transformers.

According to the switching power supply of the present invention, in cases where the characteristics of the downstream smoothing circuits of the respective center tap rectifier circuits are each different, the output of one of the secondary side coils provided in each of the different transformers can be input to each of the smoothing circuits established in parallel downstream in a certain period, and the output of the other secondary side coil provided in each of the different transformers can be input to each smoothing circuit established in parallel downstream in the next period, thereby both can be output together. The characteristics of the outputs of the smoothing circuits and transformers are equalized and the outputs stabilized.

Each smoothing circuit comprises at least a choke coil, is equipped with a common capacitor, and provided with a capacitor in accordance with the choke coil, and a plurality of smoothing circuits are assumed to exist.

In a switching power supply according to a second invention, a plurality of transformers comprise first and second transformers and the plurality of center tap rectifier circuits comprise first and second center tap rectifier circuits, one of the secondary side coils connected to the first center tap rectifier circuit being disposed in the core portion of the first transformer, while the other secondary side coil is disposed in the core portion of the second transformer, and one of the secondary side coils connected to the second center tap rectifier circuit is disposed in the core portion of the first transformer, while the other secondary side coil is disposed in the core portion of the second transformer.

That is, in cases where the switching power supply comprises first and second transformers, the secondary side coil connected to one center tap rectifier circuit belongs to the respective transformers and the output stabilizes as described above.

In the case of the switching power supply according to a third invention, the plurality of transformers comprise m (where m is an integer of three or more) transformers, the plurality of center tap rectifier circuits comprise m center tap rectifier circuits; one of the secondary side coils connected to an nth (n is an integer satisfying $2 \leq n \leq m$) center tap rectifier circuit is disposed in the core portion of the nth transformer, the other secondary side coil is disposed in the core portion of the (n-1)th transformer, and the other secondary side coil connected to the first center tap rectifier circuit is disposed in the core portion of an mth transformer.

In other words, in cases where the switching power supply comprises m transformers, the secondary side coils connected to one center tap rectifier circuit belong to transformers of a different loop and the output stabilizes as mentioned earlier.

In the case of the switching power supply according to the fourth invention, at least pairs of primary side coils are connected in series to each of the inverter circuits and the primary side coils of each of the inverter circuits are disposed in core portions of mutually different transformers.

In the case of this constitution, in cases where the downstream smoothing circuit characteristics, that is, the values of the choke coils are different, the potentials at the connection points of the primary side coils fluctuate and the induced voltages of the secondary side coils accordingly fluctuate, and the current flowing to each choke coil finally equalize. In other words, currents flowing to each choke coil are balanced and the outputs stabilize even in cases where there are manufacturing errors and assembly errors with the inductances of the choke coils.

In the case of the switching power supply according to a fifth invention, a plurality of primary side coils connected between output terminals of each of the inverter circuits are connected in series, and the primary side coils of each of the inverter circuits are magnetically coupled to the plurality of secondary side coils so that the AC resistances of the primary side coils become high alternately while the inverter circuits are driven.

In cases where the orientations of the currents flowing through the primary side coils and the secondary side coils magnetically coupled thereto are different, the AC resistance is small and, in cases where the orientations are not different, the AC resistance is high. When the diodes of the center tap rectifier circuits is used to block the current of the secondary side coil which is magnetically coupled to one of the primary side coils connected in series and to pass the current of the other magnetically coupled secondary side coil in a certain period, the primary side coil with a high AC resistance and the primary side coil with a low AC resistance are connected in series. The high frequency component therefore absorbs the high resistance component and the ringing of the switching power supply can be suppressed.

In addition, the rectifying elements constituting the rectifier circuits comprise transistors and the rectifier circuits can be made to function as inverter circuits by driving the switching of the transistors, and power can also be transmitted in the reverse direction via the rectifier circuits from the power supply provided downstream of the rectifier circuits. Two-way power transmission is thus made possible.

The output of the switching power supply of the present invention thus stabilizes.

DESCRIPTION OF THE PREFERRED
EMBODIMENTS

The switching power supply according to an embodiment will be described hereinbelow. The same elements use the same reference symbols and repetition will be avoided in the description.

Figure 1:
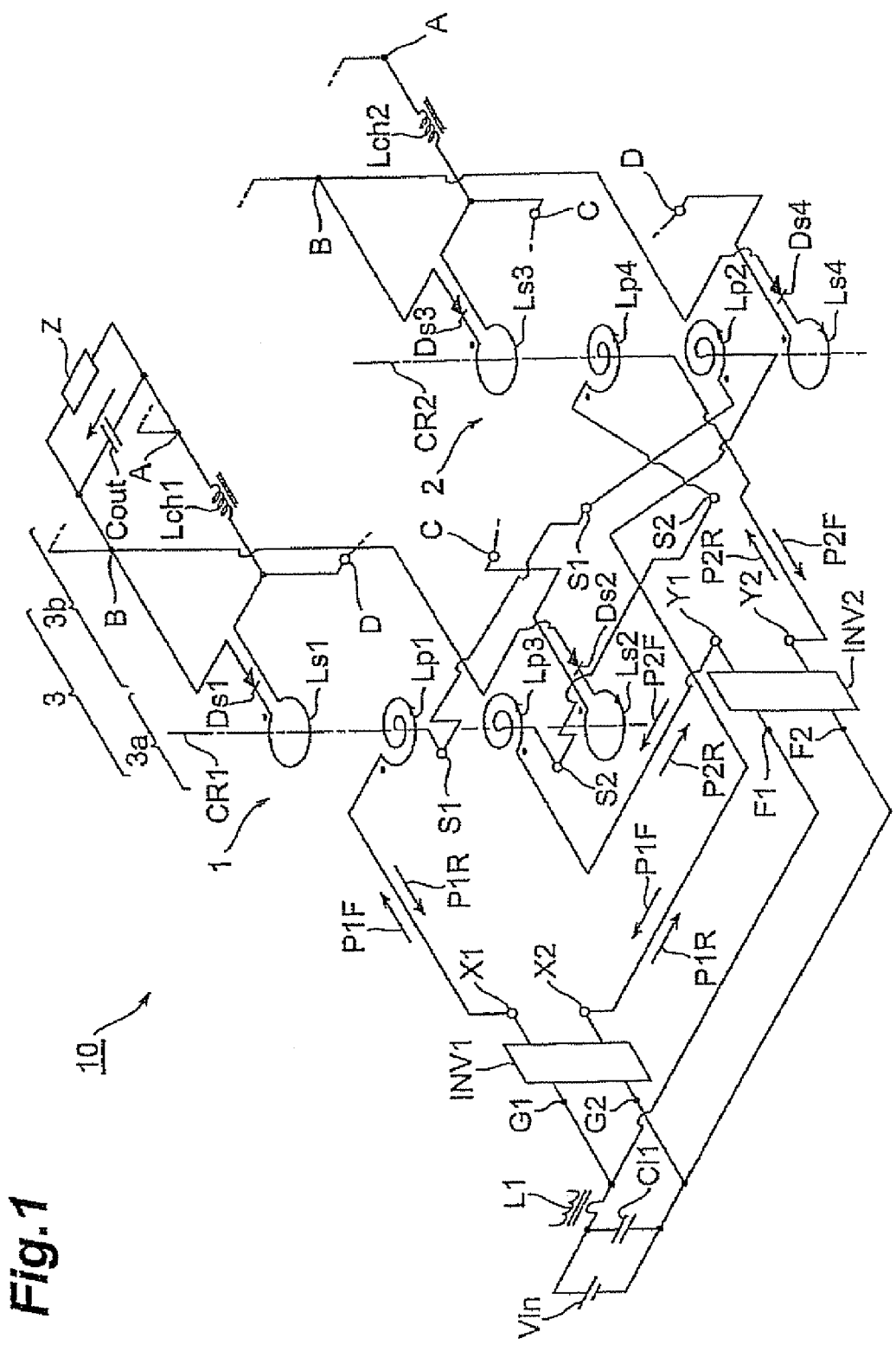
FIG. 1 is a circuit diagram of a switching power supply according to a first embodiment.

FIG. 1 is a circuit diagram of a switching power supply according to the first embodiment.

A switching power supply 10 comprises a first inverter circuit INV1 and a second inverter circuit INV2 which are connected to the input side of a transformer unit comprising a first transformer 1 that has a core CR1 constituting a core portion and a second transformer 2 that has a core CR2 constituting a core portion, a plurality of rectifier circuits 3*a* connected to the output side of the transformer portion, a smoothing circuit 3*b* connected downstream of the rectifier circuits 3*a*, a power supply Vin, a capacitor Ci1, and a current transformer L1 interposed between the high potential lines of the inverter circuits INV1 and INV2 and the power supply Vin. A load Z is connected to the output side of the switching power supply 10 and a plurality of rectifier circuits 3*a* are center tap rectifier circuits which constitute a rectifier/smoothing circuit 3 together with the smoothing circuit 3*b*. Furthermore, in this embodiment, a center tap full-wave rectifier circuit is adopted as the center tap rectifier circuit. The center tap full-wave rectifier circuit comprises two half-wave rectifier circuits and the output of a broken transformer is also rectified to establish the same polarity by the half-wave rectifier circuit. Hence, there is the advantage that the power conversion efficiency is high and the ripple voltage drops.

The first transformer 1 and the second transformer 2 constitute a transformer portion and a plurality of coils are disposed around the spatially separate two respective cores CR1 and CR2. An EE core, EI core, UU core, and UI core or the like can be used as the cores CR1 and CR2 that can be applied to such a transformer portion. The primary side of the transformer portion is provided with a first primary side coil Lp1, a second primary side coil Lp2, a third primary side coil Lp3, and a fourth primary side coil Lp4, and the secondary side of the transformer portion is provided with a first secondary side coil Ls1, a second secondary side coil Ls2, a third secondary side coil Ls3, and a fourth secondary side coil Ls4. The winding numbers NLp1, NLp2, NLp3, and NLp4 of the primary side coils Lp1, Lp2, Lp3, and Lp4 respectively satisfy the relations below:

$$NLp1+NLp2=NLp3+NLp4$$

$$NLp1+NLp3=NLp2+NLp4$$

The inverter circuits INV1 and INV2 are generally driven in phase. Since each of the transformers 1 and 2 are driven simultaneously and the voltage across the output terminals of the transformers 1 and 2 are equal.

The first transformer 1 comprises the core CR1 that extends in one direction as a foot portion. The primary side of the first transformer 1 comprises the first primary side coil Lp1 and the third primary side coil Lp3 that surround the core CR1 and the secondary side comprises the first secondary side coil Ls1 and the second secondary side coil Ls2 that surround the core CR1.

The second transformer 2 comprises the core CR2 that extends in one direction as a foot portion. The primary side of the second transformer 2 comprises the fourth primary side coil Lp4 and the second primary side coil Lp2 which surround the core CR2 and the secondary side comprises the third secondary side coil Ls3 and the fourth secondary side coil Ls4 which surround the core CR2.

In this embodiment, the coils in each of the transformers 1 and 2 are preferably flat coils which are stacked in the thickness direction, whereby the overall dimensions are reduced. That is, in the first transformer 1, the primary side coil Lp1 and the secondary side coil Ls1 are adjacent to one another and the primary side coil Lp3 and the secondary side coil Ls2 are adjacent to one another. The primary side coils Lp1 and Lp3 are also adjacent to one another. In the second transformer 2, the primary side coil Lp4 and the secondary side coil Ls3 are adjacent to one another and the primary side coil Lp2 and the secondary side coil Ls4 are adjacent to one another. In addition, the primary side coils Lp1 and Lp3 are adjacent to one another.

To describe this in detail, in one transformer, although a secondary side coil, a primary side coil, a primary side coil, and a secondary side coil are stacked in that order, the coils may also be stacked in the following order: primary side coil, secondary side coil, secondary side coil, and primary side coil.

The primary side coil Lp1 and primary side coil Lp2 are connected via a terminal S1 and connected in series between output terminals X1 and X2 of the inverter circuit INV1. Furthermore, the primary side coil Lp3 and primary side coil Lp4 are connected via a terminal S2 and connected in series between output terminals Y1 and Y2 of the inverter circuit INV2. This will be described in detail hereinbelow. However, the inverter circuits INV1 and INV2 have current flowing from the output terminal Y1 to the output terminal Y2 at the same time as current flows from an output terminal X1 to the output terminal X2 in a certain period and have current flowing from the output terminal Y2 to the output terminal Y1 at the same time as current flows from the output terminal X2 to the output terminal X1 in a subsequent period, whereupon the operation continues.

One end of the secondary side coil Ls1 is connected to one end of the capacitor Cout via a choke coil Lch1 and a node A. The other end of the capacitor Cout is connected to the anode of a diode Ds1 via a node B and the cathode of the diode Ds1 is connected to the other end of the secondary side coil Ls1, thereby constituting a current loop which flows in the forward direction of the diode Ds1.

One end of the secondary side coil Ls2 is connected to one end of the capacitor Cout via a terminal C, a choke coil Lch2, and a node A. The other end of the capacitor Cout is connected to the anode of the diode Ds2 via the node B and the cathode of the diode Ds2 is connected to the other end of the secondary side coil Ls2, thereby constituting a current loop which flows in the forward direction of the diode Ds2.

One end of the secondary side coil Ls3 is connected to one end of the capacitor Cout via the choke coil Lch2 and the node A. The other end of the capacitor Cout is connected to the anode of a diode Ds3 via the node B and the cathode of the diode Ds3 is connected to the other end of the secondary side coil Ls3, thereby constituting a current loop which flows in the forward direction of the diode Ds3.

One end of the secondary side coil Ls4 is connected to one end of the capacitor Cout via a terminal D, a choke coil Lch1, and the node A. The other end of the capacitor Cout is connected to the anode of a diode Ds4 via the node B and the cathode of the diode Ds4 is connected to the other end of the secondary side coil Ls4, thereby constituting a current loop which flows in the forward direction of the diode Ds4.

Thus, a plurality of rectifier circuits 3a comprise a first center tap fill-wave rectifier circuit and a second center tap full-wave rectifier circuit.

The first center tap full-wave rectifier circuit is constituted by arranging terminal D in the center tap connection position, by connecting the secondary side coils Ls1 and Ls4, and by means of diodes Ds1 and Ds4 which regulate the direction of the current flowing through each of the secondary side coils Ls1 and Ls4.

The second center tap full-wave rectifier circuit is constituted by arranging terminal C in the center tap connection position, by connecting the secondary side coils Ls2 and Ls3, and by means of diodes Ds2 and Ds3 which regulate the direction of the current flowing through each of the secondary side coils Ls2 and Ls3.

In addition, the switching power supply 10 comprises a plurality of smoothing circuits 3b that comprise the first choke coil Lch1, which is connected so that current flows from the secondary side coil Ls1 or Ls4, the second choke coil Lch2, which is connected so that current flows from the secondary side coil Ls2 or Ls3, and the capacitor Cout, which is connected between the node A at the one end of the first choke coil Lch1 and the second choke coil Lch2 and the node B. A load Z is connected to the smoothing circuit 3b via an output terminal.

Here, the plurality of smoothing circuits 3b comprise, in parallel, a first smoothing circuit, which comprises the choke coil Lch1 and the capacitor Cout, and a second smoothing circuit, which comprises the choke coil Lch2 and the capacitor Cout, the respective first and second smoothing circuits being equipped with the common capacitor Cout. A plurality of smoothing circuits are assumed. At least one choke coil position may be provided in a single smoothing circuit or a constitution in which a single smoothing circuit comprises a plurality of choke coils divided between a plurality of positions can also be adopted.

As described hereinabove, suppose that, in a certain period, current flows from the output terminal X1 of the first inverter circuit INV1 to the output terminal X2 and current flows from the output terminal Y1 of the second inverter circuit INV2 to the output terminal Y2. Thus, a counterclockwise rotation current flows in the primary side coils Lp1 and Lp3 of the first transformer 1 and, at the same time, a counterclockwise rotation current flows in the primary side coils Lp4 and Lp2 of the second transformer 2. Among the secondary side coils, the coils which correspond to the forward current of the diodes to which a current in the opposite direction from these currents is connected are the secondary side coils Ls2 and Ls4 when the orientation of the diodes to which the respective secondary side coils are connected are considered. Since the orientation of the current induced by the current in the primary side coils is the orientation of the reverse current in the diodes connected to the respective coils, current does not flow in principle to the remaining secondary side coils Ls1 and Ls3.

When current flows in the secondary side coils Ls2 and Ls4, current flows to the node A via the second choke coil Lch2 and the first choke coil Lch1 respectively. The smoothing of the output is performed by the smoothing circuit 3b which comprises the downstream capacitor Cout and the choke coils Lch1 and Lch2.

In cases where both the inverter circuits INV1 and INV2 supply currents P1F and P2F to each primary side coil, connections are made so that current flows into the capacitor Cout in the direction of the arrow from the secondary side coil Ls4 via the terminal D and the first choke coil Lch1 and so that current similarly flows into the capacitor Cout from the secondary side coil Ls2 via the terminal C and the second choke coil Lch2.

Thereafter, let us suppose that current flows from the output terminal X2 to the output terminal X1 of the first inverter circuit INV1 and that current flows from the output terminal Y2 to the output terminal Y1 of the second inverter circuit INV2. In this case, a clockwise rotation current flows at the same time to the primary side coils Lp1, Lp3, Lp2, and Lp4. Among the secondary side coils, the coils which correspond to the forward current of the diodes to which a current in the opposite direction from these currents is connected are the secondary side coils Ls1 and Ls3 when the orientation of the diodes to which the respective secondary side coils are connected are considered. Since the orientation of the current induced by the current in the primary side coils is the orientation of the reverse current in the diodes connected to the respective coils, current does not flow in principle to the remaining secondary side coils Ls2 and Ls4.

According to this embodiment, as mentioned earlier, in the first transformer 1, the primary side coil Lp1 and the secondary side coil Ls1 are adjacent to one another and the primary side coil Lp3 and the secondary side coil Ls2 are adjacent to one another. In addition, the primary side coils Lp1 and Lp3 are adjacent to one another. In the second transformer 2, the primary side coil Lp4 and the secondary side coil Ls3 are adjacent to one another and the primary side coil Lp2 and the secondary side coil Ls4 are adjacent to one another. The primary side coils Lp1 and Lp3 are also adjacent to one another.

The primary side coils which are magnetically coupled to the secondary side coils in which current does not flow have a high impedance and the primary side coils which are magnetically coupled to the secondary side coils in which current flows have a low impedance. Therefore, in order to achieve a low impedance, the primary side coils in which current flows and the secondary side coils in which current flow are placed adjacent to one another so that, though slight, a high magnetic coupling is achieved. Furthermore, in order to achieve a high impedance, the primary side coil in which current flows and the secondary side coil in which current does not flow are disposed apart from one another so that, though slight, the magnetic coupling is low.

When current flows in the secondary side coils Ls1 and Ls3, current flows to the nodes A via the first choke coil Lch1 and the second choke coil Lch2 respectively. Output smoothing is performed by means of a smoothing circuit that comprises the downstream capacitor Cout and the choke coils Lch1 and Lch2.

As mentioned earlier, in cases where the inverter circuits INV1 and INV2 supply currents P1R and P2R to each primary side coil, connections are made so that current flows into the capacitor Cout in the direction of the arrow from the secondary side coil Ls1 via the first choke coil Lch1 and so that current similarly flows into the capacitor Cout from the secondary side coil Ls3 via the second choke coil Lch2.

A detailed description will be provided hereinbelow.

Each coil is preferably a flat coil and a counterclockwise winding, for example, when viewed from one side. Supposing that a current flows in the secondary side coils in the direction in which the magnetic field produced in accordance with the electrification of the primary side coils is negated. Generally, because a current in the opposite direction from the primary side coil is induced in the secondary side coil, in cases where the primary side coil and secondary side coil are adjacent to one another, if the AC resistance (impedance) is low as a result of the skin effect and the proximity effect and the output current in the secondary side coil adjacent to the primary side coil is blocked by utilizing the reverse withstand voltage of the diode, the AC resistance of the primary side coil is then high.

When an input voltage in one direction is input from the inverter circuit INV1 to the primary side coils Lp1 and Lp2 connected in series, the current P1F flows to the primary side coils Lp1 and Lp2. Here, because the primary side coil Lp2 is disposed closer to the secondary side coil Ls4 in which the forward current of the diode Ds4 is flowing, the primary side coil Lp2 is magnetically coupled to the secondary side coil Ls4 relatively tightly.

Here, because the primary side coil Lp2 and secondary side coil Ls4 have mutually opposite current flow orientations based on transformer principles, the primary side coil Lp2 has a low AC resistance as a result of the proximity effect in comparison with cases where coil groups with the same current orientation are placed in proximity to one another or with cases where coils in which current does not flow are placed in proximity to one another.

However, by virtue of being disposed more remotely from the secondary side coil Ls2 in which the forward current of the diode Ds2 flows, the primary side coil Lp1 is magnetically coupled to the secondary side coil Ls2 relatively sparsely. Here, because the primary side coil Lp1 is disposed more closely to the secondary side coil Ls1 in which current does not flow, the primary side coil Lp1 has a high AC resistance as a result of the proximity effect in comparison with the primary side coil Lp2. However, in this embodiment, the primary side coil Lp1 and the primary side coil Lp2 are connected to one another in series and the primary side coil Lp1 and the primary side coil Lp2 therefore have mutually equal currents flowing therein.

When a reverse input voltage is input from the inverter circuit INV1 to the serially connected primary side coils Lp1 and Lp2, current P1R flows to the primary side coils Lp1 and Lp2. Here, the primary side coil Lp1 is disposed closer to the secondary side coil Ls1 in which the forward current of the diode Ds1 is flowing and is therefore magnetically coupled to the secondary side coil Ls1 relatively tightly.

Here, because the primary side coil Lp1 and secondary side coil Ls1 have mutually opposite current orientations based on transformer principles, the primary side coil Lp1 has a low AC resistance as a result of the proximity effect in comparison with cases where coil groups with the same current orientation are placed in proximity to one another or with cases where coils in which current does not flow are placed in proximity to one another.

However, by virtue of being disposed more remotely from the secondary side coil Ls3 in which the forward current of the diode Ds3 flows, the primary side coil Lp2 is magnetically coupled to the secondary side coil Ls3 relatively sparsely. Here, because the primary side coil Lp2 is disposed more closely to the secondary side coil Ls4 in which current does not flow, the primary side coil Lp2 has a high AC resistance as a result of the proximity effect in comparison with the primary side coil Lp1. However, in this embodiment, the primary side coil Lp1 and the primary side coil Lp2 are connected to one another in series and the primary side coil Lp1 and the primary side coil Lp2 therefore have mutually equal currents flowing therein.

When a one-direction input voltage is input from the inverter circuit INV2 to the serially connected primary side coils Lp3 and Lp4, current P2F flows to the primary side coils Lp3 and Lp4. Here, the primary side coil Lp3 is disposed closer to the secondary side coil Ls2 in which the forward current of the diode Ds2 is flowing and is therefore magnetically coupled to the secondary side coil Ls2 relatively tightly.

Here, because the primary side coil Lp3 and the secondary side coil Ls2 have mutually opposite current orientations based on transformer principles, the primary side coil Lp3 has a low AC resistance as a result of the proximity effect in comparison with cases where coil groups with the same current orientation are placed in proximity to one another or with cases where coils in which current does not flow are placed in proximity to one another.

However, by virtue of being disposed more remotely from the secondary side coil Ls4 in which the forward current of the diode Ds4 flows, the primary side coil Lp4 is magnetically coupled to the secondary side coil Ls4 relatively sparsely. Here, because the primary side coil Lp4 is disposed more closely to the secondary side coil Ls3 in which current does not flow, the primary side coil Lp4 has a high AC resistance as a result of the proximity effect in comparison with the primary side coil Lp3. However, in this embodiment, the primary side coil Lp3 and the primary side coil Lp4 are connected to one another in series and the primary side coil Lp3 and the primary side coil Lp4 therefore have mutually equal currents flowing therein.

When a reverse input voltage is input to the from the inverter circuit INV2 to the serially connected primary side coils Lp3 and Lp4, the current P2R flows to the primary side coils Lp3 and Lp4. Here, the primary side coil Lp4 is disposed closer to the secondary side coil Ls3 in which the forward current of the diode Ds3 is flowing and is therefore magnetically coupled to the secondary side coil Ls3 relatively tightly.

Here, because the primary side coil Lp4 and secondary side coil Ls3 have mutually opposite current orientations based on transformer principles, the primary side coil Lp4 has a low AC resistance as a result of the proximity effect in comparison with cases where coil groups with the same current orientation are placed in proximity to one another or with cases where coils in which current does not flow are placed in proximity to one another.

However, by virtue of being disposed more remotely from the secondary side coil Ls1 in which the forward current of the diode Ds1 flows, the primary side coil Lp3 is magnetically coupled to the secondary side coil Ls1 relatively sparsely. Here, because the primary side coil Lp3 is disposed more closely to the secondary side coil Ls2 in which current does not flow, the primary side coil Lp3 has a high AC resistance as a result of the proximity effect in comparison with the primary side coil Lp4. However, in this embodiment, the primary side coil Lp3 and the primary side coil Lp4 are connected to one another in series and the primary side coil Lp3 and the primary side coil Lp4 therefore have mutually equal currents flowing therein.

Thus, according to this embodiment, because the primary side coils Lp1 and Lp2 (Lp3, Lp4) are connected to one another in series, a large current also flows in a coil with a large AC resistance. Hence, the ringing generated in the output AC voltage of the transformer which occurs due to the LC resonance of the transformer line capacity, the transformer excitation inductance and the transformer leakage inductance can be attenuated by the high AC resistance. As a result, the amount of heat generated by the core loss of the transformer and the AC resistance of the transformer drops and the efficiency improves.

As mentioned earlier, in cases where current is supplied the primary side coil in one direction by arranging secondary side choke coils Lch1 and Lch2, the current that passes through both the first choke coil Lch1 and the second choke coil Lch2 flows into the capacitor Cout from the second secondary side coil Ls2 and the fourth secondary side coil Ls4. In cases where the current is supplied in the reverse direction, current from the first secondary side coil Ls1 and the third secondary side coil Ls3 flows into the capacitor Cout via both the first choke coil Lch1 and the second choke coil Lch2.

In either case, the total of the current flowing through the first choke coil Lch1 and the second choke coil Lch2 flows to the capacitor Cout and the load Z. In the case of this structure, the current flowing through the first choke coil Lch1 and the current flowing through the second choke coil Lch2 are equalized and the outputs are stable. The details will be provided hereinafter.

As described hereinabove, a plurality of primary side coils Lp1 and Lp2 (Lp3, Lp4) which are connected across the output terminals of the respective inverter circuits INV1 (INV2) are connected in series and the AC resistances of the primary side coils Lp1 and Lp2 (Lp3, Lp4) of each of the respective inverter circuits are magnetically coupled to the plurality of secondary side coils Ls1, Ls4 (Ls2, Ls3) so as to become alternately higher while the inverter circuits are being driven. Hence, the high resistance component absorbs the high frequency component and the ringing of the switching power supply can be suppressed.

Figure 2A:
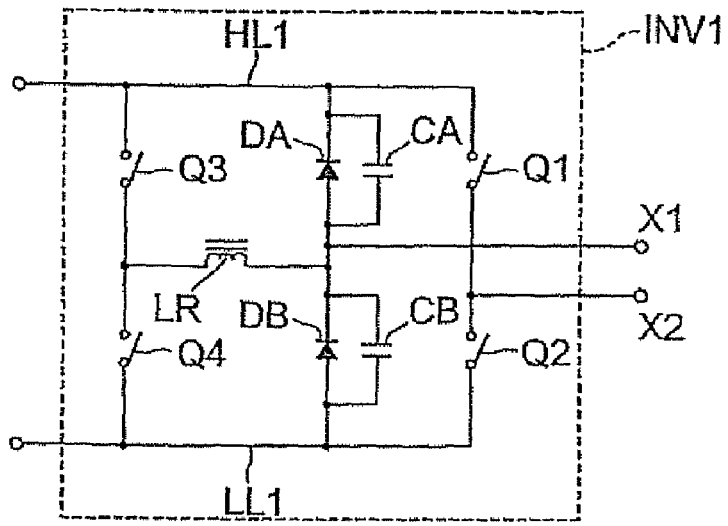
FIG. 2A is a circuit diagram of an inverter circuit.
Figure 2B:
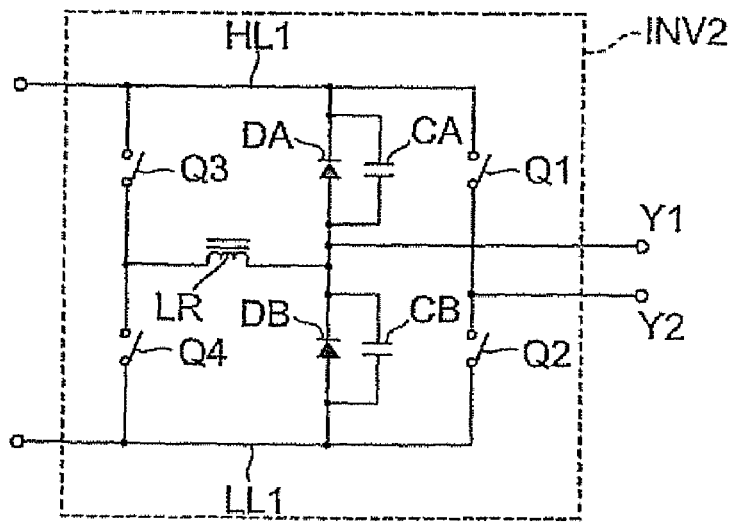
FIG. 2B is a circuit diagram of an inverter circuit.
Figure 2C:
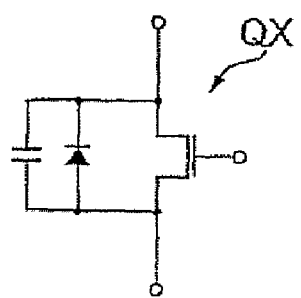
FIG. 2C is a circuit diagram of a switch QX.

FIGS. 2A to 2C shows circuit diagrams for inverter circuits.

As shown in FIG. 2A, the inverter circuit INV1 comprises switches Q1 and Q2 and switches Q3 and Q4, which are interposed in series between a high potential line HL1 and a low potential line LL1. The connection point between switches Q3 and Q4 is connected to the output terminal X1 via a resonance inductor LR. The connection point between switches Q1 and Q2 is connected to the output terminal X2. Diodes DA and DB to which a reverse bias is applied if necessary may be connected in series between the high potential line HL1 and the low potential line LL1, the capacitors CA and CB connected in parallel to the diodes DA and DB may be connected, and one end on the output side of the resonance inductor LR may also be fixed to the connection point.

As shown in FIG. 2B, the structure of the inverter circuit INV2 is the same as the structure of the inverter circuit INV1 and, in the above description, the output terminals X1 and X2 may be read instead as the output terminals Y1 and Y2 respectively.

FIG. 2B is a circuit diagram of each switch QX (X=1, 2, 3, 4). Each of the switches Q1, Q2, Q3, and Q4 of this example comprises a field effect transistor and the switches are turned ON/OFF in accordance with a gate-source voltage Vgs. As shown in FIG. 2C, a parasitic element comprising a diode to which a reverse bias voltage is applied and a capacitor which is connected parallel to the diode is attached across the source and drain of the transistor.

In a state where switches Q1 and Q4 are turned OFF and switches Q3 and Q2 are turned ON in the first inverter circuit INV1, the current P1F flows from the terminal X1 to the terminal X2 and a forward current flows to the diode Ds4 shown in FIG. 1. However, in a state where switches Q2 and Q3 are turned OFF and the switches Q1 and Q4 are turned ON, current P1R from the terminal X2 to the terminal X1 flows and the forward current flows to the diode Ds1 shown in FIG. 1.

In a state where the switches Q1 and Q4 are turned OFF and where the switches Q3 and Q2 are turned ON in the second inverter circuit INV2, current flows from the terminal Y1 to the terminal Y2 and a forward current flows to the diode D2 shown in FIG. 1. However, in a state where the switches Q2 and Q3 are turned OFF and where the switches Q1 and Q4 are turned ON, the current P2R from the terminal Y2 to the terminal Y1 flows and a forward current flows to the diode Ds3 shown in FIG. 1.

Figure 3:
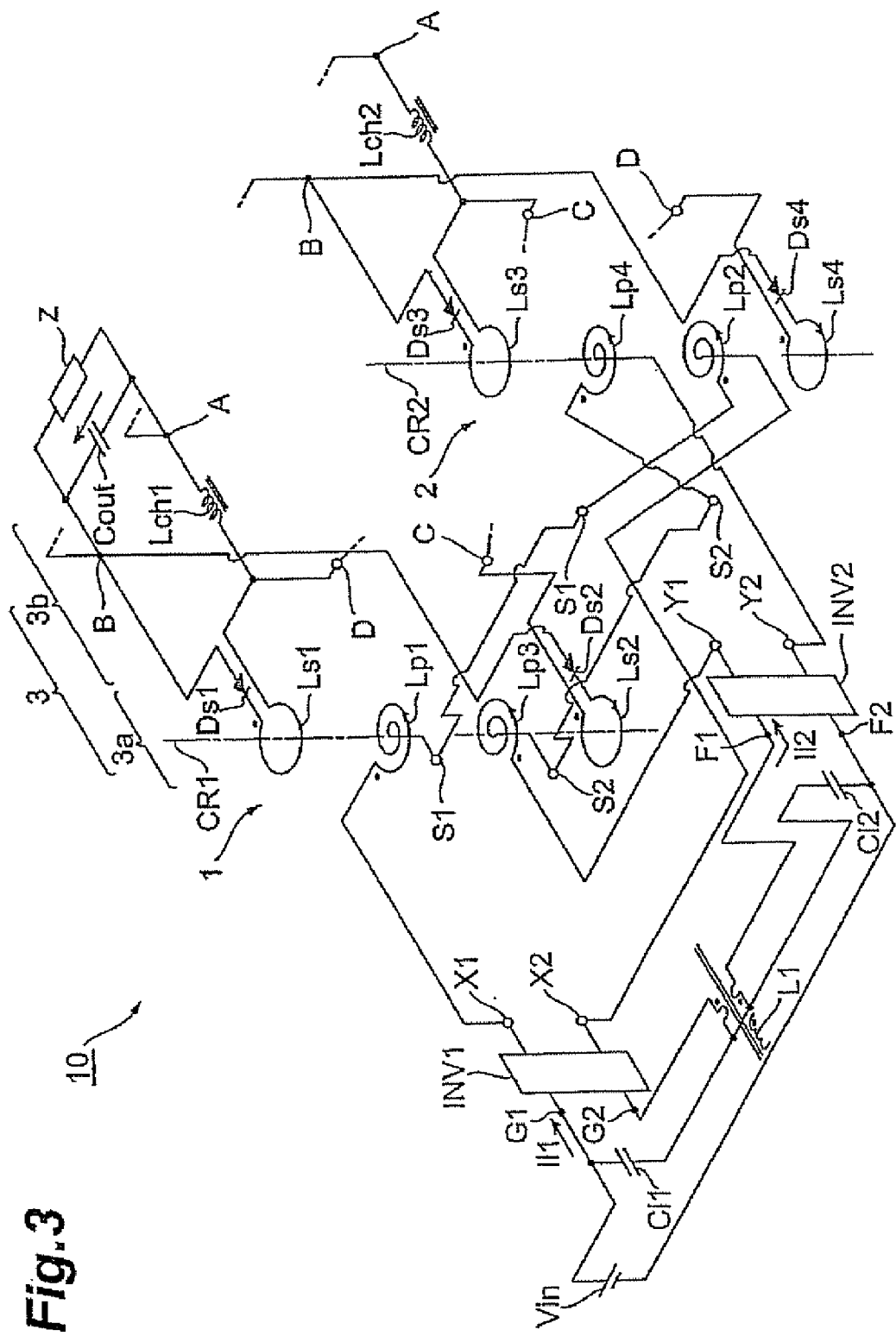
FIG. 3 is a circuit diagram of a switching power supply according to a second embodiment.

FIG. 3 is a circuit diagram of the switching power supply according to the second embodiment.

The difference between the switching power supply 10 of the second embodiment and the switching power supply 10 of the first embodiment is the connection on the upstream side of the inverter circuits INV1 and INV2. In other words, in the switching power supply 10 of the first embodiment, the inverter circuits INV1 and INV2 are connected in parallel to the power supply Vin.

In the case of the second embodiment, the first inverter circuit INV1 and the second inverter circuit INV2 are connected in series between the high potential line and the low potential line. The capacitor Ci1 and a capacitor Ci2 are connected in series between the high potential line connected to the positive terminal of the power supply Vin and the low potential line connected to the negative terminal. The first inverter circuit INV1 comprises a pair of input terminals G1 and 62 and the capacitor Ci1 is interposed between the input terminals G1 and G2. The second inverter circuit INV2 comprises a pair of input terminals F1 and F2 and the capacitor Ci2 is interposed between the input terminals F1 and F2. In other words, the connection point between the first inverter circuit INV1 and the second inverter circuit INV2 is connected to the connection point between the capacitor Ci1 and the capacitor Ci2.

A common current transformer L1 is interposed between the low potential line of the first inverter circuit INV1 and the high potential line of the second inverter circuit INV2 as shown in FIG. 3. The common current transformer L1 detects current and the detected current can also be utilized in inverter circuit switching control.

The remaining constitution of the second embodiment is the same as that of the first embodiment.

In the case of the above constitution, the following operating results are exhibited in addition to operating results which are the same as those of the first embodiment. In other words, with this structure, the voltage across the terminals of the capacitor Ci1 and the voltage across the terminals of the capacitor Ci2 are balanced and the output stabilizes even in cases where the capacities of the plurality of capacitors Ci1 and Ci2 provided on the input side of the first inverter circuit INV1 and the second inverter circuit INV2 vary from one product to the next. That is, input voltages VCi1 and VCi2 to the inverter circuits INV1 and INV2 do not readily change as a result of a difference in the capacities of the capacitors Ci1 and Ci2.

The primary side coils Lp1 and Lp3 belong to the same transformer 1 and are coupled by sharing magnetic flux, whereby current flows in the same direction. The winding number ratio NLp1: NLp3 of both primary side coils is the ratio VLp1:VLp3 between the voltages of the primary side coils. Furthermore, the primary side coils Lp2 and Lp4 belong to the same transformer 2 and are coupled by sharing the magnetic flux, whereby current flows in the same direction. The winding number ratio NLp2:NLp4 of both primary side coils is the ratio VLp2:VLp4 between the voltages of the primary side coils. NLp1+NLp2=NLp3+NLp4, NLp1+NLP3=NLp2+NLp4 and the potential difference between the terminals X1 and X2 and the potential difference between the terminals Y1 and Y2 are equal.

In the ON-duty period of the inverter circuit INV1, terminals G1 and X1 and terminals G2 and X2 are connected or terminals G1 and X2 and terminals G2 and X1 are connected.

In the ON-duty period of the inverter circuit INV2, terminals F1 and Y1 and terminals F2 and Y2 are connected or terminals Y1 and Y2 and terminals Y2 and Y1 are connected.

Therefore, the potential difference between the terminals G1 and G2 and the potential difference between the terminals F1 and F2 are equal. Further, the current Ii1 flowing between the terminals X1 and X2 and the current Ii2 flowing between the terminals Y1 and Y2 are equal. The primary side inverter circuits INV1 and INV2 are connected in series and the capacitors Ci1 and Ci2 are also connected in series. Supposing that the capacities of the capacitors Ci1 and Ci2 differ and the midpoint potential thereof fluctuates to establish a capacity inverse ratio. However, as mentioned earlier, the potential difference between the terminals G1 and G2 and the potential difference between the terminals F1 and F2 are equal and the midpoint potential between the capacitors Ci1 and Ci2 converges on ½ of Vin.

Figure 4:
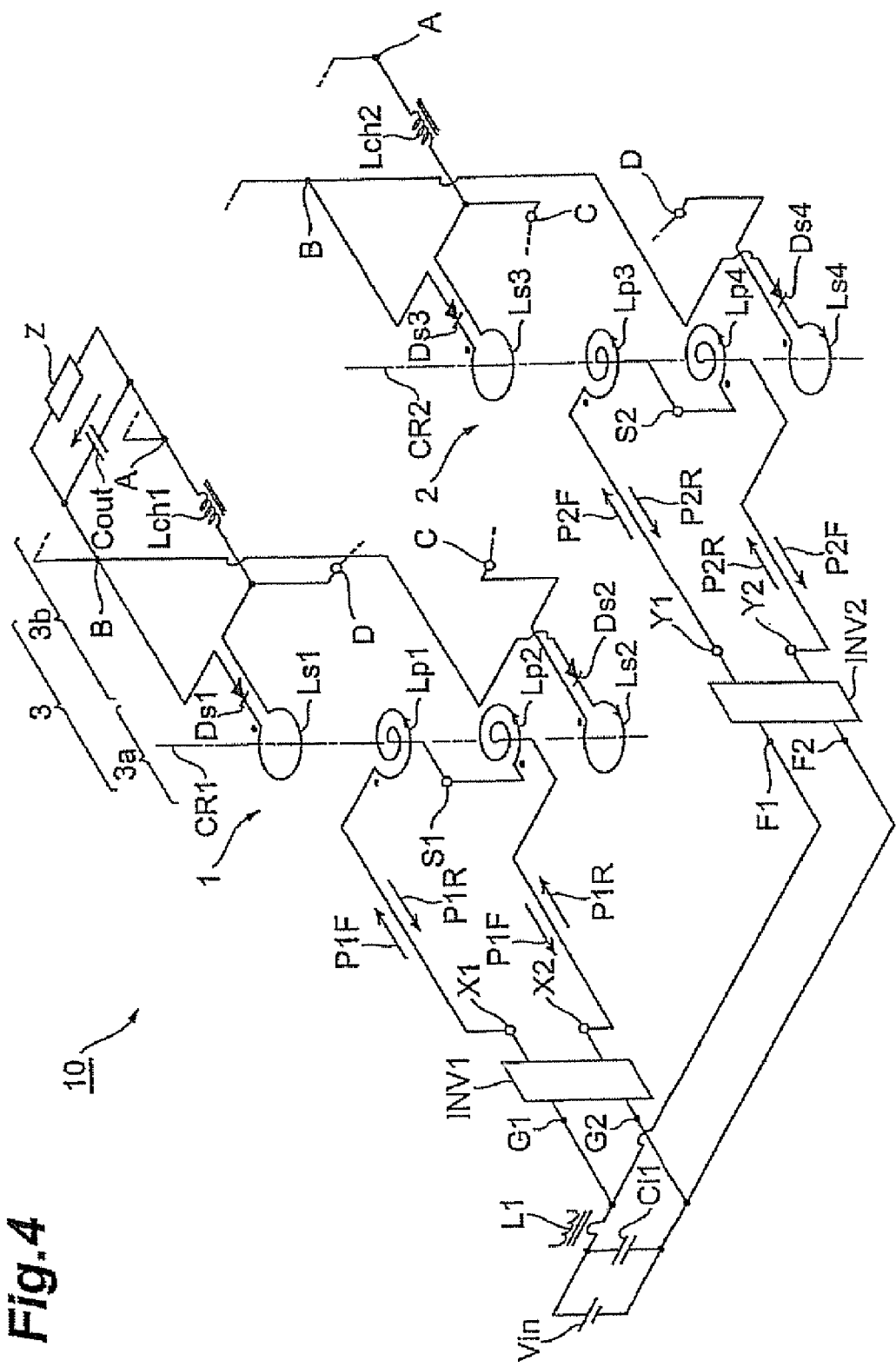
FIG. 4 is a circuit diagram of a switching power supply according to a third embodiment.

FIG. 4 is a circuit diagram of the switching power supply of the third embodiment.

The difference between the switching power supply 10 of the third embodiment and the switching power supply 10 of the first embodiment lies with the connections between each of the primary side coils Lp1, Lp2, Lp3, and Lp4 connected to the inverter circuits INV1 and INV2. In the case of the switching power supply 10 of the first embodiment, among the primary side coils connected to the first inverter circuit INV1, the primary side coils belonging to a different transformer (Lp1 and Lp2) are connected in series and, among the primary side coils connected to the second inverter circuit INV2, primary side coils belonging to different transformers (Lp3, Lp4) are connected in series.

In contrast, the primary side coils Lp1, Lp2, Lp3, and Lp4 of this embodiment belong to the same transformer for each of the inverter circuits and the primary side coils which belong to different transformers are not connected in series. More specifically, the primary side coils Lp1 and Lp2 connected to the first inverter circuit INV1 are provided only in the first transformer 1 that comprises the core CR1 and the primary side coils Lp3 and Lp4 connected to the second inverter circuit INV2 are provided only in the second transformer 2 that comprises the core CR2. The remaining constitution of the third embodiment is the same as that of the first embodiment.

So too with this constitution, a pair of secondary side coils Ls1 and Ls4 (Ls2, Ls3) connected to each center tap rectifier circuit each belong to another transformer and the output of the center tap rectifier circuit comprising diodes Ds1 and Ds4 passes via the choke coil Lch1 and the output of the center-tap rectifier circuit comprising diodes Ds2 and Ds3 passes through the choke coil Lch2 and, because a plurality of smoothing circuits comprising the respective choke coils Lch1 and Lch2 are established in parallel, variations in the output corresponding with the inductance difference between each of the choke coils Lch1 and Lch2 can be equalized.

In other words, in cases where forward currents are flowing in the second diode Ds2 and the fourth diode Ds4 in a certain period, these currents flow to different choke coils Lch2 and Lch1 respectively and the plurality of smoothing circuits 3b are established in parallel and therefore the total value of the currents flows into the capacitor Cout. The current flowing in the second diode Ds2 is subject to the influence of the first transformer 1 and the current flowing in the fourth diode Ds4 is subject to the influence of the second transformer 2 and therefore the total value of the currents is obtained by equalizing the influence of both the transformers 1 and 2 and the influence of the choke coils Lch1 and Lch2 through which the currents each flow.

Furthermore, in cases where a forward current is flowing to the first diode Ds1 and the third diode Ds3 in a subsequent period, these currents flow to the separate choke coils Lch1 and Lch2 respectively. Because a plurality of smoothing circuits 3b are provided in parallel, the total value of the current flows into the capacitor Cout. The current flowing through the first diode Ds1 is subjected to the influence of the first transformer 1 and the current flowing through the third diode Ds3 is subjected to the influence of the second transformer 2. Hence, the total value is obtained by equalizing both the influence of both of the transformers 1 and 2 and the influence of the choke coils Lch1 and Lch2 through which the currents flow.

In other words, there is the advantage that all of the current flowing into the capacitor Cout is equalized in both periods This advantage is also implemented in the first and second embodiments.

In addition, according to the first and second embodiments, the primary side coil pairs connected in series in each of the inverter circuits INV1 and INV2 belong to separate transformers 1 and 2. Hence, in one transformer, the primary side coil, which is close to the secondary side coil in which a large current is flowing, receives, from the transformer, a different influence from the primary side coil which is spaced apart from the secondary side coil in which a large current is flowing in the other transformer. In other words, as a result of the characteristic difference of the smoothing circuit limiting the current flowing in the secondary side coil, that is, the difference in the inductances of the choke coils Lch1 and Lch2, the potential of the terminal S1 which is the connection point of the primary side coils Lp1 and Lp2 shown in FIG. 1 and the potential of the terminal S2 which is the connection point of the primary side coils Lp3 and Lp4 shift and, accordingly, the induced voltage of the corresponding secondary side coil changes and the current flowing in the choke coils Lch1 and Lch2 converge to become substantially the same current and the output stabilizes.

Figure 5:
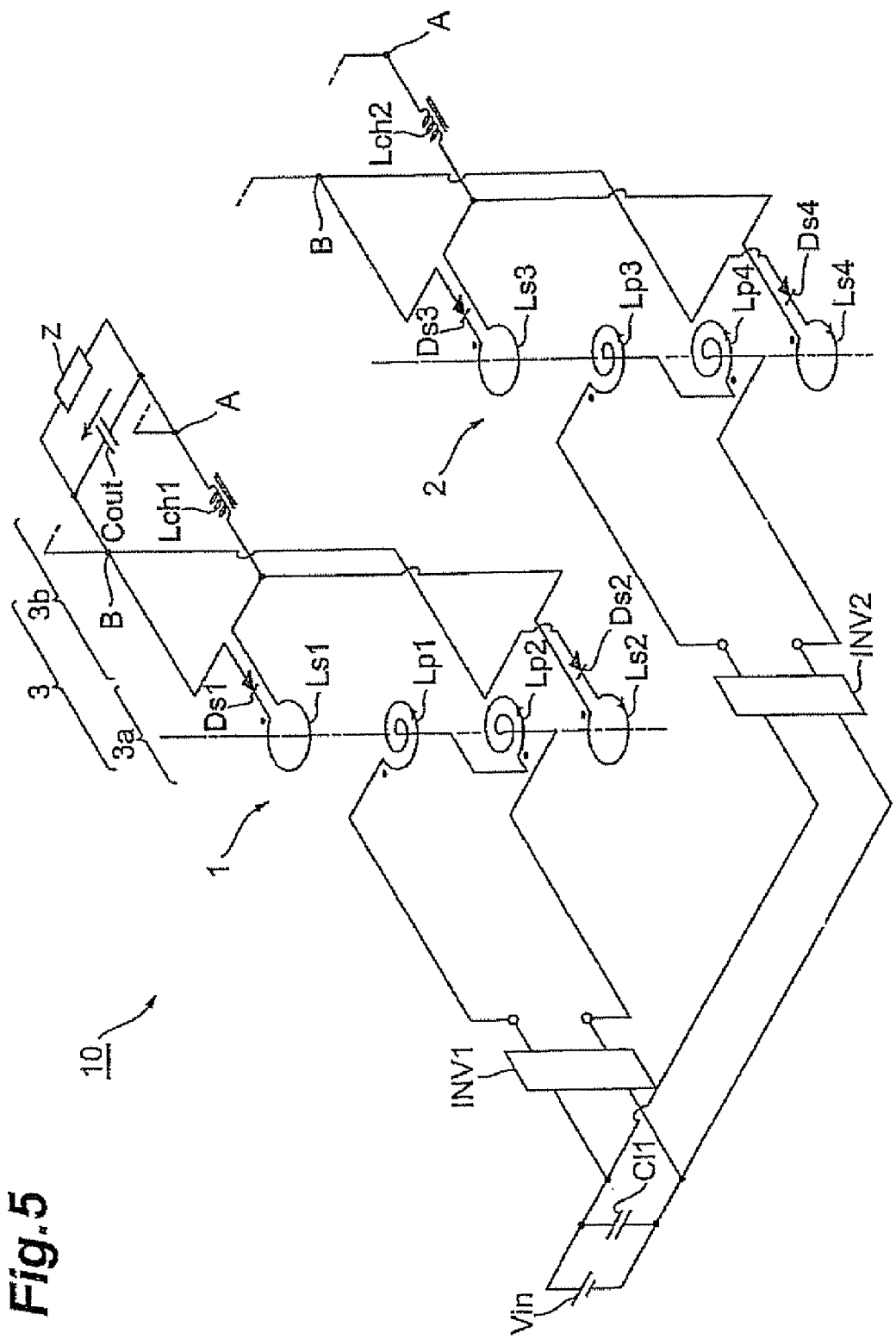
FIG. 5 is a circuit diagram of a switching power supply according to a comparative example.

FIG. 5 is a circuit diagram of the switching power supply of a comparative example.

In the switching power supply 10 according to the comparative example, the primary side coils Lp1, Lp2, Lp3, and Lp4 are connected in series as shown in FIG. 5 for each of the transformers 1 and 2 and the current flowing through the secondary side coils Ls1 and Ls2 (Ls3, Ls4) of each transformer 1(2) are both different from those of the first embodiment in that these currents flow through their own choke coil Lch1 (Lch2).

The details of the operation of each of the switching power supplies 10 above will be provided next by using timing charts.

Figure 6:
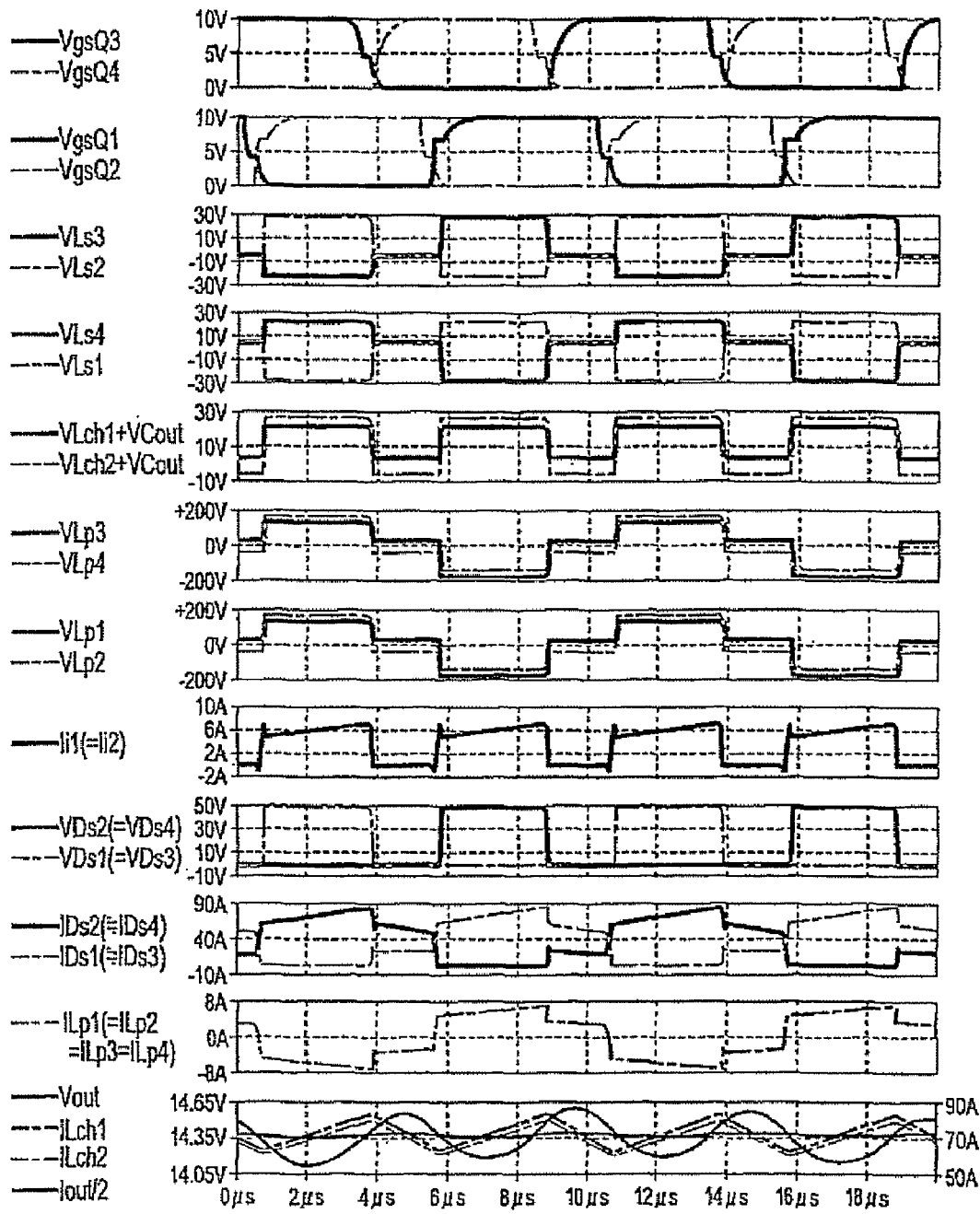
FIG. 6 is a timing chart for the switching power supply according to the first embodiment.
Figure 7:
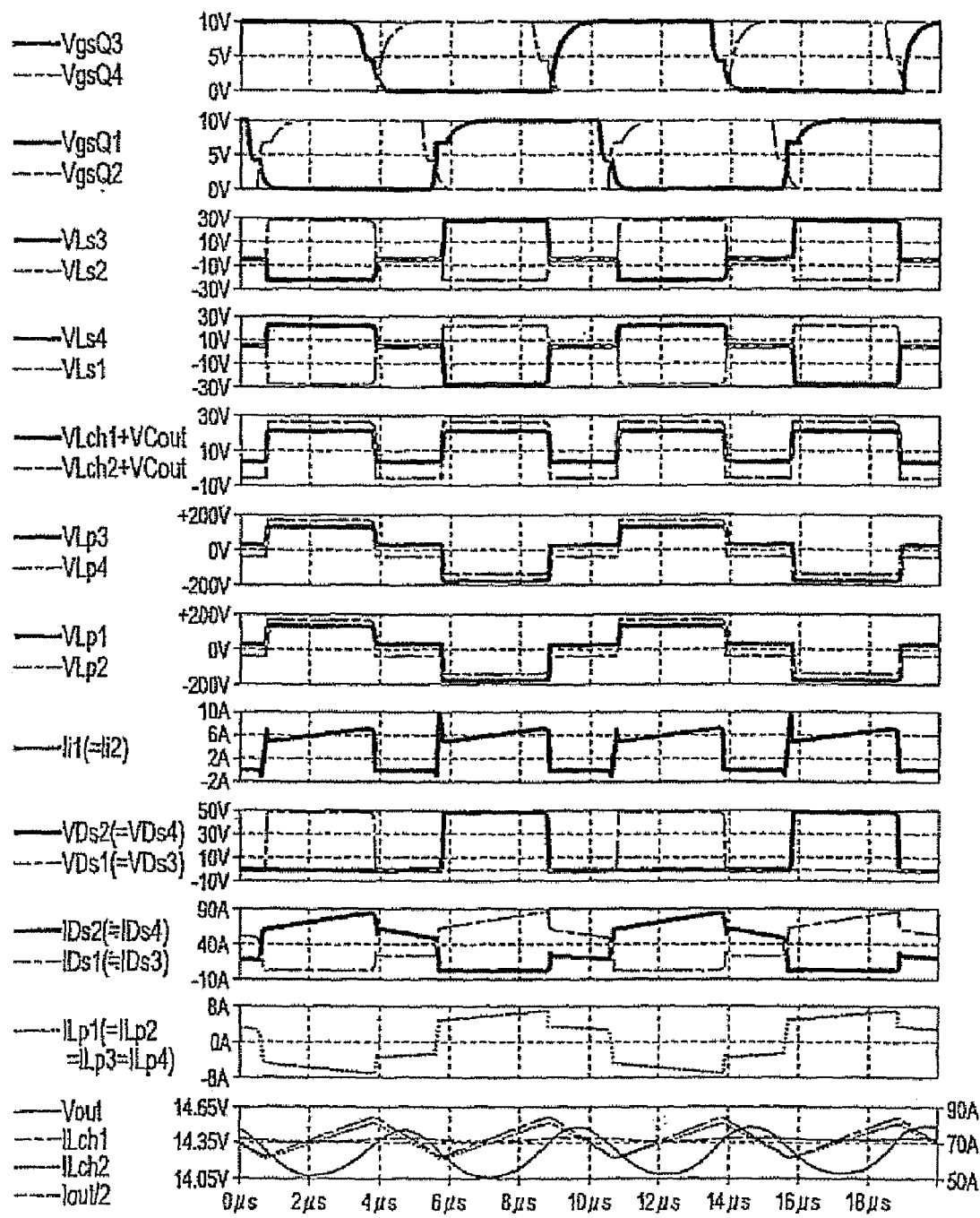
FIG. 7 is a timing chart for the switching power supply according to the second embodiment.
Figure 8:
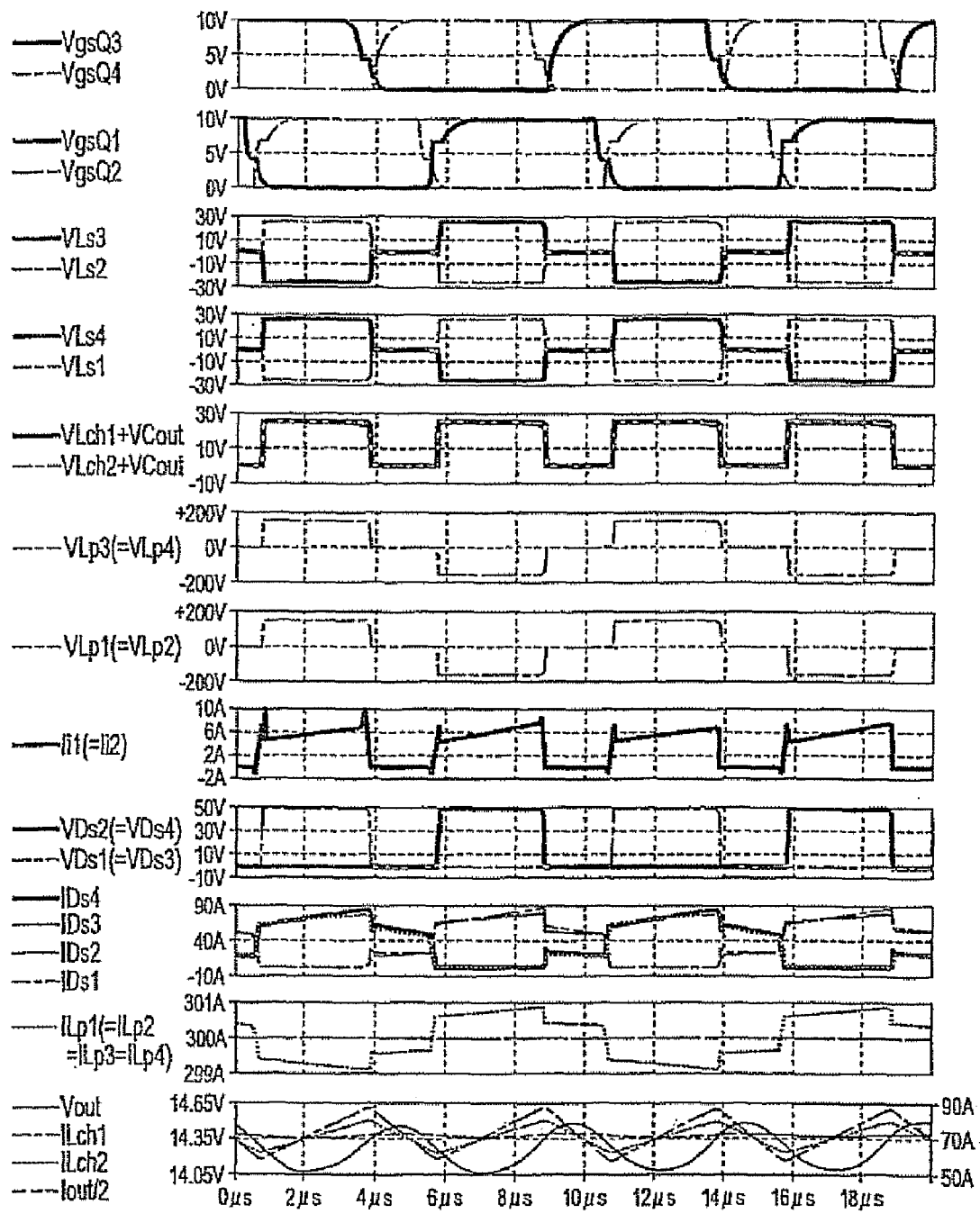
FIG. 8 is a timing chart for the switching power supply according to the third embodiment.
Figure 9:
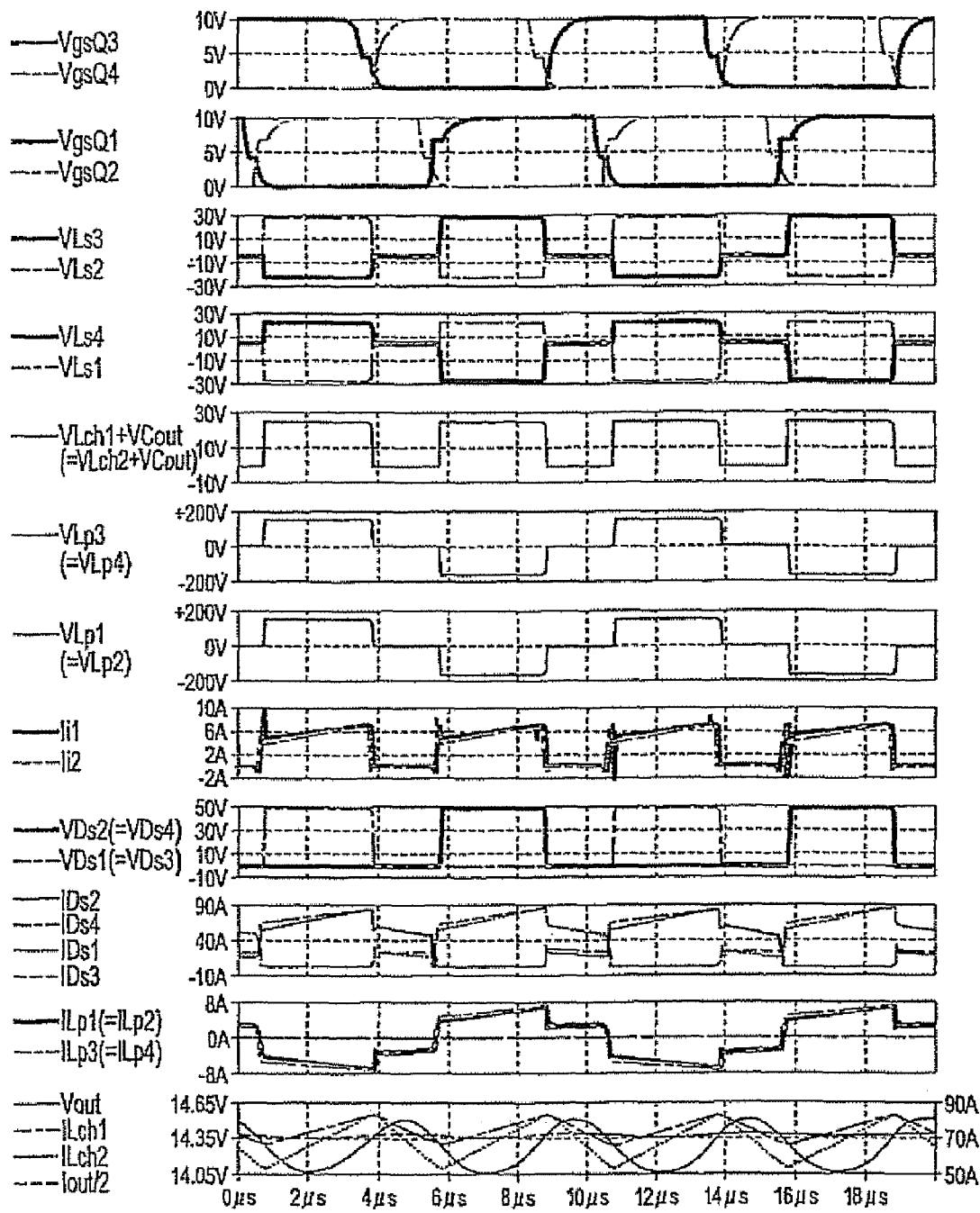
FIG. 9 is a timing chart for a switching power supply according to a comparative example.

FIG. 6 is a timing chart for the switching power supply according to the first embodiment; FIG. 7 is a timing chart for the switching power supply according to the second embodiment; FIG. 8 is a timing chart for the switching power supply according to the third embodiment; and FIG. 9 is a timing chart for the switching power supply according to the comparative example.

The parameters in FIG. 6 represent the following:

In each timing chart, the inductance of the choke coil Lch2 is set at a value which is two times the inductance of the choke coil Lch1, such that the difference between the first and second embodiments and the comparative example is clear.

VgsQ3: gate-source voltage of switch Q3
VgsQ4: gate-source voltage of switch Q4
VgsQ1: gate-source voltage of switch Q1
VgsQ2: gate-source voltage of switch Q2
VLs2: voltage across the two terminals of the secondary side coil Ls2
VLs3: voltage across the two terminals of the secondary side coil Ls3
VLs1: voltage across the two terminals of the secondary side coil Ls1
VLs4: voltage across the two terminals of the secondary side coil Ls4
VLch1: voltage across the two terminals of the choke coil Lch1
VLch2: voltage across the two terminals of the choke coil Lch2
VCout: voltage across the two terminals of the capacitor Cout
VLp3: voltage across the two terminals of the primary side coil Lp3
VLp4: voltage across the two terminals of the primary side coil Lp4
VLp1: voltage across the two terminals of the primary side coil Lp1
VLp2: voltage across the two terminals of the primary side coil Lp2
Ii1: input current to inverter circuit INV1
Ii2: input current to inverter circuit INV2
VDs1: voltage across the two terminals of the diode Ds1
VDs3: voltage across the two terminals of the diode Ds3
VDs2: voltage across the two terminals of the diode Ds2
VDs4: voltage across the two terminals of the diode Ds4
IDs1: current flowing to the diode Ds1
IDs3: current flowing to the diode Ds3
IDs2: current flowing to the diode Ds2
IDs4: current flowing to the diode Ds4
ILp1: current flowing to primary side coil Lp1
ILp2: current flowing to primary side coil Lp2
ILp3: current flowing to primary side coil Lp3
ILp4: current flowing to primary side coil Lp4
Vout: output voltage supplied to load Z
ILch1: current flowing to choke coil Lch1
ILch2: current flowing to choke coil Lch2
Iout/2: 50% of output current flowing through load Z
VCi1: voltage across the two terminals of the capacitor Ci1
VCi2: voltage across the two terminals of the capacitor Ci2

First, the timing of the switching power supply of the first embodiment shown in FIG. 1 will be described by using FIG. 6. VLp1 to VLp4 are positive in cases where the potential of a terminal with a dark spot at the start of the coil winding is greater than the potential of a terminal with no dark spot. Furthermore, VLs1 to VLs4 are positive in cases where the choke side potential is greater than the diode side potential.

The switches Q1, Q2, Q3, and Q4 shown in of FIGS. 2A and 2B are turned ON in cases where the voltage VgsQ1, VgsQ2, VgsQ3, and VgsQ4 are high-level voltages and OFF when these voltages are low-level voltages. In an ON period in which the switches Q3 and Q2 shown in FIGS. 2A and 2B are both ON, in the ON period, current flows from the output terminal X1 to the output terminal X2 of the inverter INV1 and current flows from the output terminal Y1 to the output terminal Y2 of the inverter INV2. Furthermore, the switches Q4 and Q1 shown in FIGS. 2A and 2B are both in an ON period, current flows from the output terminal X2 to the output terminal X1 of the inverter INV1 and current flows from the output terminal Y2 to the output terminal Y1 of the inverter INV2. In FIGS. 2A and 2B, switches Q1 and Q4 are provided in both of the inverter circuits INV1 and INV2 but FIG. 6 shows that switches of the same coding are in sync.

Switches Q3 and Q4 turn ON alternately and switches Q1 and Q2 turn ON alternately. Furthermore, switches Q3 and Q2 phase-shift and repeatedly turn ON and OFF and switches Q4 and Q1 also phase-shift and repeatedly turn ON and OFF, whereby the switching power supply constitutes a phase shift converter. In other words, in a period of overlap between ON periods of a switch pair which generates a single current path, an input voltage is applied to the primary side coil and, the longer the period of overlap, the greater the amount of current output per unit of time.

Thus, switches Q1 to Q4 perform switching and deliver a switching pulse. Hence, as is illustrated, a voltage is applied to the primary side coils Lp1 to Lp4. More specifically, in a period in which the switches Q3 and Q2 are both ON, the potential of the terminal X2 (Y2) is lower than the potential of the terminal X1 (Y1) and current flows from the terminal X1 to the terminal X2 and from the terminal Y1 to the terminal Y2. The voltages of each coil are such that the upstream side of the coils is at a high potential and the downstream side of the coils is at a low potential when current is flowing. The orientation of the voltages of the primary side coil voltages VLp1, VLp2, VLp3, and VLp4 in this period is positive.

Furthermore, in a period in which the switches Q4 and Q1 are both ON, the potential of the terminal X1 (Y1) is lower than the potential of the terminal X2 (Y2) and current flows from the terminal X2 to the terminal X1 and from the terminal Y2 to the terminal Y1. In this period, the primary side coil voltages VLp1, VLp2, VLp3, and VLp4 swing in a negative direction.

Further, in a period in which the switch Q4 is ON and the switch Q1 is OFF or in a period in which the switch Q4 is OFF and the switch Q1 is ON, and in a period in which the switch Q3 is ON and the switch Q2 is OFF or in a period in which the switch Q2 is OFF and the switch Q3 is ON, the primary side coil voltages VLp1, VLp2, VLp3, and VLp4 are substantially 0V. The voltage difference between the primary side coils Lp3 and Lp4 and the voltage difference between the primary side coils Lp1 and Lp2 will be described hereinbelow.

In each transformer, a first center tap rectifier circuit formed by secondary side coils Ls1 and Ls4 and diodes Ds1 and Ds4 is constituted and a second center tap rectifier circuit formed by secondary side coils Ls2 and Ls3 and diodes Ds2 and Ds3 is constituted. In a period in which the voltages of the primary side coils Lp1 to Lp4 swing positive as a result of a change in the current due to a change in the voltages VLp1 to VLp4 of the primary side coils Lp1 to Lp4, the potential of the secondary side coils Ls2 and Ls4 swings positive and, in a period in which the voltages of the primary side coils Lp1 to Lp4 swing negative, the potential of the secondary side coils Ls1 and Ls3 swing positive.

Further, in a period in which the primary side coil voltages VLp1 to VLp4 are close to 0V, the voltages VLs1 to VLs4 of the secondary side coils are also in a state of being close to 0V. Differences also arise with the high and low voltages and voltages close to 0V between the set of the secondary side coil voltages VLs2 and VLs3 and the set of the secondary side coil voltages VLs1 and VLs4 and these differences will be described hereinbelow.

The voltage from the secondary side coils Ls1 and Ls4 (the total voltage VLch1+VCout) are applied to the choke coil Lch1 and the capacitor Cout and the voltages from the secondary side coils Ls2 and Ls3 (the total voltage VLch2+VCout) are applied to the choke coils Lch2 and the capacitor Cout. The point that the fluctuation band of VLch2+VCout is greater than VLch1 VCout will be described subsequently.

The input currents Ii1 and Ii2 which are to the inverter circuits INV1 and INV2 respectively are such that current always flows in the same way in the inverter circuits INV1 and INV2 and a load is not applied only to one of the parallel converters and the load stabilizes.

The currents Ii1 and Ii2 pass through each switch in the inverter circuits INV1 and INV2 and flow to the primary side coils Lp1 to Lp4. The same current flows to each of the primary side coils Lp1 to Lp4 and therefore Lp1=Lp2=Lp3=Lp4 are also shown in this timing chart.

The secondary side coil voltages VLs1 and VLs3 are in sync and, as a result, the voltages across the two terminals of the diode VDs1 and VDs3 are also in sync as a result. VDs1 and VDs3 are also the same voltage. Furthermore, the secondary side coil voltage VLs2 and VLs4 are in sync and the voltages across the two terminals of the diode VDs2 and VDs4 are accordingly also in sync. VDs2 and VDs4 also have the same voltage.

The diode currents IDs1 and IDs3 are in sync and substantially the same and the diode currents IDs2 and IDs4 are also in sync and substantially the same.

The choke coil currents ILch1 and ILch2 are substantially the same and balanced. This is for the reasons outlined below.

The current of the secondary side coils Ls1 and Ls4 are governed by the choke coil Lch1. Likewise, the currents of the secondary side coils Ls2 and Ls3 are governed by the choke coil Lch2. The current of the choke coil Lch1 is fixed by the voltages VLs1 and VLs4 of the secondary side coils Ls1 and Ls4 respectively and the current of the choke coil Lch2 is fixed by the voltages VLs2 and VLs3 of the secondary side coils Ls2 and Ls3 respectively. The voltages of the secondary side coils Ls1 and Ls2 are fixed by the ratio of the windings of the primary side coils Lp1 and Lp3 and the voltages of the secondary side coils Ls3 and Ls4 are fixed by the ratio of the windings of the primary side coils Lp4 and Lp2. Furthermore, the current ratio of the secondary side coils Ls1 and Ls2 and the primary side coils Lp1 and Lp3 is fixed by the inverse ratio of the number of windings of the primary side coils and secondary side coils and the current ratio of the secondary side coils Ls3 and Ls4 and the primary side coils Lp4 and Lp2 is also fixed by the inverse ratio between the numbers of windings of the primary side coil and secondary side coil. The primary side coils spanning the two transformers are connected in series and the currents flowing in the primary side coils Lp1 and Lp2 are therefore equal and the currents flowing in the primary side coils Lp3 and Lp4 are also equal.

Therefore, if there is no variation in the output of each inverter circuit INV1 and INV2 and no differences between each of the transformers 1 and 2 and each of the choke coils Lch1 and Lch2, the switching power supply essentially operates in a balanced fashion.

However, let us suppose that there is variation between the inductances of the choke coils Lch1 and Lch2, for example. This being the case, the current flowing to the choke coils Lch1 and Lch2 varies accordingly. Here, according to the first embodiment, the inductance of the choke coil Lch2 is set at a value that is two times the inductance of the choke coil Lch1 intentionally for the sake of the description. The current of each choke coil when same are regarded as fixed current sources is different for the ILch1 and ILch2 as a result of the variation in the values of these choke coils Lch1 and Lch2. This fact contradicts the fact that the current flowing in the primary side coils Lp1 and Lp2 and the current flowing in the primary side coils Lp3 and Lp4 are equal.

Therefore, the winding midpoint potential of the transformers, that is, the potential of the connection point between the primary side coils Lp1 and Lp2 and the potential of the connection point between the primary side coils Lp3 and Lp4 change and, as a result of the voltage ratio of the serially linked primary side coils being adjusted, a difference appears in VLp3 and VLp4 and a difference appears in the VLp1 and VLp2 as mentioned earlier and the primary side coil voltage ratio is adjusted. As a result of this adjustment, a difference also arises in the voltage between the linked secondary side coils Ls1 to Ls4 and the difference between the VLs2 and VLs3 and the difference between the VLs1 and VLs4 shown in FIG. 6 appear. Furthermore, the current in each choke coil changes from a varying state and is restored to a balanced state. That is, as shown in the lower part of FIG. 6, the currents ILch1 and ILch2 flowing to the two choke coils Lch1 and Lch2 respectively converge to become substantially the same and centered on half the output current Iout.

The timing for the switching power supply of the second embodiment shown in FIG. 3 will be described next by using FIG. 7.

According to the second embodiment, the input voltage of the power supply Vin is set at two times that of the first embodiment. Furthermore, as mentioned earlier, in the case of the switching power supply of the second embodiment, the voltage across the two terminals of the capacitors Ci1 and Ci2 is balanced and the output is stable, the waveform of each parameter in the switching power supply being the same as that of the first embodiment. In the case of the switching power supply of the second embodiment, as per the case of the first embodiment, a difference arises as shown in FIG. 7 in the voltages VLp1, VLp2, VLp3, and VLp4 of the primary side coils and the currents ILch1 and ILch2 which flow to the two choke coils Lch1 and Lch2 respectively are substantially the same and centered on half the final output current Iout. The voltages across the two terminals of the capacitors Ci1 and Ci2 are the same.

The timing for the switching power supply of the third embodiment shown in FIG. 4 will be described next by using FIG. 8.

According to the third embodiment, the primary side coils Lp1 and Lp2 connected to the inverter circuit INV1 belong to the same transformer 1 and the primary side coils Lp3 and Lp4 connected to the inverter circuit INV2 belong to the same transformer 2. The current IDs1 flowing in the diode Ds1 and the current IDs3 flowing in the diode Ds3 are in sync and the current IDs2 flowing in the diode Ds2 and the current IDs4 flowing in the diode Ds4 are in sync. However, in reality, a slight difference arises in the size of the currents IDs1 and IDs3 and a difference is generated between the currents IDs2 and IDs4. According to the first embodiment, the currents IDs1 and IDs3 flowing to the diodes Ds1 to Ds4 are in sync and substantially the same and the currents IDs2 and IDs4 are in sync and substantially the same.

Furthermore, unlike the first embodiment, the voltages VLp1 and VLp2 of the primary side coils Lp1 and Lp2 are the same and the voltages VLp3 and VLp4 of the primary side coils Lp3 and Lp4 are also the same. That is, the currents ILch1 and ILch2 flowing to the choke coils Lch1 and Lch2 are not balanced as per the first embodiment.

However, in one ON-duty period, the current IDs1 flowing in the diode Ds1 and the current IDs3 flowing in the diode Ds3 passes through different choke coils Lch1 and Lch2 and the total value thereof flows to the capacitor Cout and the load Z and, in the next ON-duty period, the current IDs2 flowing in the diode Ds2 and the current IDs4 flowing in the diode Ds4 passes through different choke coils Lch2 and Lch1 and the total value thereof flows to the capacitor Cout and the load Z. Hence, on the whole, smoothing is performed evenly by a smoothing circuit that comprises the capacitor Cout and the output of the smoothing circuit is equalized and, as shown at the bottom of FIG. 8, an output of one half the output current Iout is stable The rest of the operation is the same as that for the first embodiment.

The timing for the switching power supply according to the comparative example shown in FIG. 5 will be described next by using FIG. 9.

Each timing event is similar to that shown in FIG. 6. However, in the comparative example, the primary side coils and secondary side coils are connected completely within each of the transformers 1 and 2 and connections spanning different transformers are not made. Therefore, in cases where the inductance of the choke coil Lch2 is set at two times the inductance of the choke coil Lch1, the effect of the inductance is received directly and the current flowing to the primary side coils Lp1 to Lp4 is ILp1=ILp2 and ILp3=ILp4. However, this differs for each of the transformers 1 and 2. Furthermore, as a result of the difference between the currents flowing to the primary side coils, the current flowing to each of the rectifier diodes Ds1 to Ds4 are also different. More specifically, although the currents IDs1 and IDs3 are in sync, the sizes thereof differ and, although the currents IDs2 and IDs4 are also in sync, the sizes thereof differ. Therefore, there is no convergence between the currents flowing to each of the choke coils Lch1 and Lch2 and a large difference remains between these currents.

As illustrated hereinabove, the difference in the fluctuations of ILch1 and ILch2 is smaller than that of the comparative example in the case of all of the embodiments and value fluctuations of 50% of the output current Iout are also suppressed.

Figure 10:
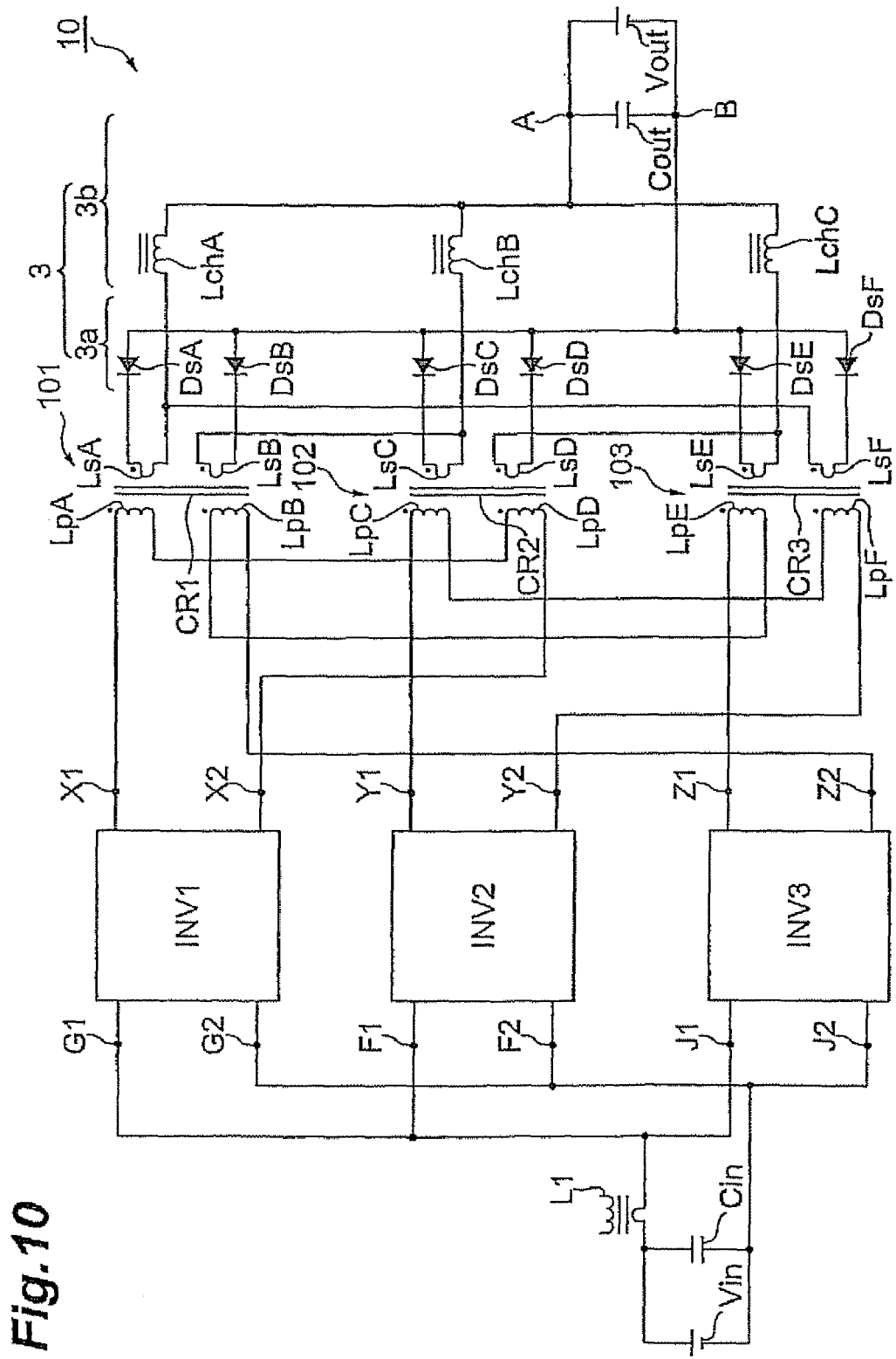
FIG. 10 is a circuit diagram showing the connective relationship in a case where three transformers are employed.

FIG. 10 is a circuit diagram of the switching power supply showing the connective relationship in a case where three transformers are employed.

In this example, the constitution is one in which high-impedance primary side coils and low-impedance primary side coils are connected in series.

The constitutions of the inverter circuits INV1 and INV2 are the same as those described above. The constitution of an inverter circuit INV3 is the same as that of the inverter circuit INV1 and the input terminals of the inverter circuit INV3 are J1 and J2 and the output terminals are Z1 and Z2.

The output terminal X1 of the inverter circuit INV1 is connected to the output terminal X2 via the primary side coil LpA and LpD.

The output terminal Y1 of the inverter circuit INV2 is connected to the output terminal Y2 via the primary side coils LpC and LpF.

The output terminal Z1 of the inverter circuit INV3 is connected to the output terminal Z2 via the primary side coils LpE and LpB.

Supposing that the start of the coil winding is one end and the end of the winding is the other end, one end of a secondary side coil LsA is connected to the cathode of a diode DsA, while the other end is connected to the first end A of the capacitor Cout via a choke coil LchA and the second end B of the capacitor Cout is connected to the anode of the diode DsA.

The second end of a secondary side coil LsB is connected to the cathode of a diode DsB, while the first end of the secondary side coil LsB is connected to the first end A of the capacitor Cout via a choke coil LchB and the second end B of the capacitor Cout is connected to the anode of the diode DsB.

One end of a secondary side coil LsC is connected to the cathode of a diode DsC, while the other end is connected to the first end A of the capacitor Cout via the choke coil LchB and the second end B of the capacitor Cout is connected to the anode of the diode DsC.

The second end of a secondary side coil LsD is connected to the cathode of a diode DsD, while the first end of the secondary side coil LsD is connected to the first end A of the capacitor Cout via a choke coil LchC and the second end B of the capacitor Cout is connected to the anode of the diode DsD.

The first end of a secondary side coil LsE is connected to the cathode of a diode DsE, while the second end of the secondary side coil LsE is connected to the first end A of the capacitor Cout via the choke coil LchC and the second end B of the capacitor Cout is connected to the anode of the diode DsE.

The second end of a secondary side coil LsF is connected to the cathode of a diode DsF, while the first end of the secondary side coil LsF is connected to the first end A of the capacitor Cout via a choke coil LchA and the second end B of the capacitor Cout is connected to the anode of the diode DsF.

A first transformer 101 comprises primary side coils LpA and LpB and secondary side coils LsA and LsB which are provided around the core CR1 constituting a core portion.

A second transformer 102 comprises primary side coils LpC and LpD and secondary side coils LsC and LsD which are provided around the core CR2 constituting a core portion.

A third transformer 103 comprises primary side coils LpE and LpF and secondary side coils LsE and LsF which are provided around a core CR3 constituting a core portion.

In a certain period, when current flows from the output terminal X1 to X2, current flows from the output terminal Y1 to Y2, and current flows from output terminal Z1 to Z2, a current flows in the reverse direction and the impedance drops in the secondary side coils in cases where current is not blocked by the diode of the rectifier circuit 3a and, in cases where the current is blocked by the diode, the impedance is relatively high. That is, the primary side coils LpA, LpC, and LpE have a high impedance and the primary side coils LpB, LpD, and LpF have a low impedance. These are connected in series as mentioned earlier in each current path and the high-impedance primary side coils LpA, LpC, and LpE therefore absorb oscillations and suppress ringing.

In the next period, when current flows from output terminal X2 to X1, current flows from output terminal Y2 to Y1, and current flows from output terminal Z2 to Z1, the opposite phenomenon from that described above occurs in the secondary side coils. The primary side coils LpA, LpC, and LpE have a low impedance and the primary side coils LpB, LpD, and LpF have a high impedance. These are connected in series as mentioned hereinabove in each current path and the high-impedance primary side coils LpB, LpD, and LpF therefore absorb oscillations and suppress ringing.

As for the secondary side coils, current flows to the low-impedance secondary side coils. However, for one of the secondary side coils in each of the transformers, current flows to the first end A of the capacitor Cout via the choke coil which corresponds with a different transformer from the transformer to which the secondary side coil itself belongs.

In other words, the currents flowing in the secondary side coils LsB, LsD, and LsF which belong to the transformers 101, 102, and 103 flow to the choke coil LchB which belongs to the transformer 102, the choke coil LchC which belongs to the transformer 103, and the choke coil LchA which belongs to the transformer 101 respectively.

Furthermore, as for the other secondary side coil in each of the transformers, current flows to the first end A of the capacitor Cout via the choke coil which corresponds with the transformer to which the secondary side coil itself belongs. The currents flowing in the secondary side coils LsA, LsC, and LsE belonging to the transformers 101, 102, 103 respectively flow to the choke coil LchA which belongs to the transformer 101, the choke coil LchB which belongs to the transformer 102, and the choke coil LchC which belongs to the transformer 103 respectively.

In addition, the first transformer 101 comprises a first primary side coil LpA, a first secondary side coil LsA which is magnetically coupled to the first primary side coil LpA, a second primary side coil LpB, and a second secondary side coil LsB which is magnetically coupled to the second primary side coil LpB.

The second transformer 102 comprises a third primary side coil LpC, a third secondary side coil LsC which is magnetically coupled to the third primary side coil LpC, a fourth primary side coil LpD, and a fourth secondary side coil LsD which is magnetically coupled to the fourth primary side coil LpD.

The third transformer 103 comprises a fifth primary side coil LpE, a fifth secondary side coil LsE which is magnetically coupled to the fifth primary side coil LpE, a sixth primary side coil LpF, and a sixth secondary side coil LsF which is magnetically coupled to the sixth primary side coil LpF.

The first center tap rectifier circuit comprises diodes DsA and DsF and the connection point between the secondary side coils LsA and LsF is the center tap position to which the choke coil LchA is connected, the choke coil LchA constituting a smoothing circuit together with the capacitor Cout.

The second center tap rectifier circuit comprises diodes DsB and DsC and the connection point between the secondary side coils LsB and LsC is the center tap position to which the choke coil LchB is connected, the choke coil LchB constituting a smoothing circuit together with the capacitor Cout.

A third center tap rectifier circuit comprises diodes DsD and DsE and the connection point between the secondary side coils LsD and LsE is the center tap position to which the choke coil LchC is connected, the choke coil LchC constituting a smoothing circuit together with the capacitor Cout. This plurality of smoothing circuits are established in parallel with one another.

In cases where the inductances of the choke coils LchA, LchB, and LchC contained in the smoothing circuit 3b are different, the potential at the respective midpoints of the primary side coils LpA and LpD, the primary side coils LpB and LpE, and the primary side coils LpC and LpF which are connected in series shift in the same way as in the first embodiment and, as a result, the currents flowing in the choke coils LchA, LchB, and LchC are balanced and converge. Because these choke currents flow together to the coil Cout, the output stabilizes. Although the output voltage Vout is indicated by the symbol for a power supply in FIG. 10, the load mentioned earlier is inserted in this position.

As is illustrated hereinabove, in the switching power supply of this embodiment, a plurality of transformers comprise the first transformer 101, the second transformer 102, and the third transformer 103 and comprise the first center tap rectifier circuit, the second center tap rectifier circuit, and the third center tap rectifier circuit. One of the secondary side coils (LsA) connected to the first center tap rectifier circuit is disposed in the core portion of the first transformer 101, while the other secondary side coil (LsF) is disposed in the core portion of the third transformer 103. One of the secondary side coils (LsB) connected to the second center tap rectifier circuit is disposed in the core portion of the first transformer 101, while the other secondary side coil (LsC) is disposed in the core portion of the second transformer 102. One of the secondary side coils (LsD) connected to the third center tap rectifier circuit is disposed in the core portion of the second transformer 102, while the other (LsE) is disposed in the core portion of the third transformer 103. The connective relationship of the secondary side coils is that of a state where the secondary side coils loop through each of the cores. If this embodiment is put to practical use, the constitution can be such that, even in a case where there are four or more inverter circuits INV and core portions, the connective relationship of the secondary side coils is such that same loop through the whole core. Generally speaking, m is an integer of three or more and m cores and center tap rectifier circuits are assumed and, if n is an integer of 2 or more and m or less, the following is true.

One of the secondary side coils connected to the nth center tap rectifier circuit is disposed in the core portion of the nth transformer, the other secondary side coil is disposed in the core portion of the (n-1)th transformer, and the other secondary side coil connected to the first center tap rectifier circuit is disposed in the core portion of the mth transformer.

Figure 11:
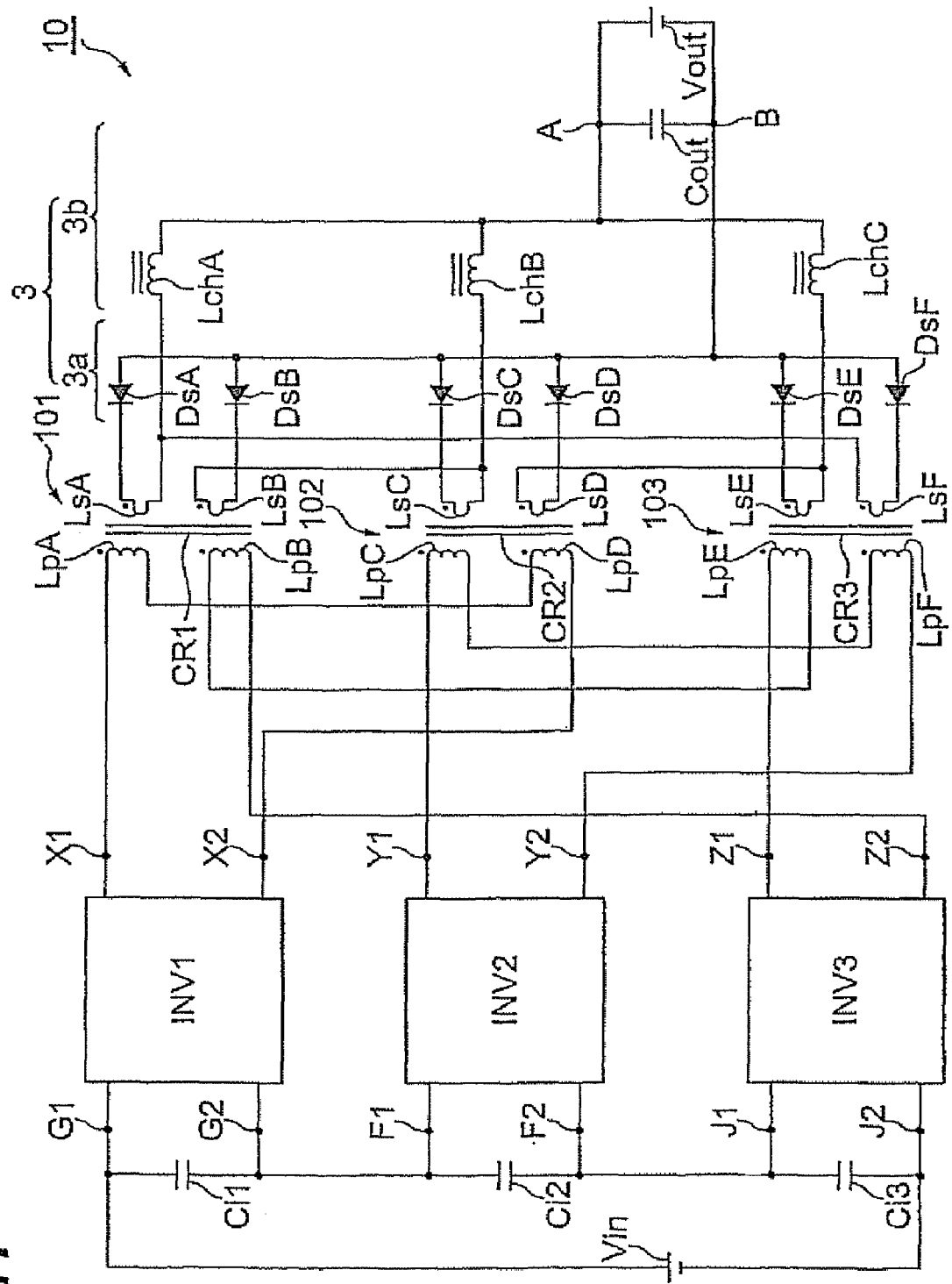
FIG. 11 is a circuit diagram showing the connective relationship in a case where three transformers are employed.

FIG. 11 shows the connection on the input side of the inverter circuits INV1, INV2, and INV3 in the power switching supply shown in FIG. 10 in the same way as the second embodiment. The capacitor Ci1 is interposed between the input terminals G1 and G2 of the inverter circuit INV1, the capacitor Ci2 is interposed between the input terminals F1 and F2 of the inverter circuit INV2, and a capacitor Ci3 is interposed between the input terminals J1 and J2 of the inverter circuit INV3. The input terminal G1 is connected to the high potential side of the power supply Vin and the input terminal J2 is connected to the low potential side of the power supply Vin.

Among the primary side coils, the primary side coils belonging to a different transformer (LpA, LpD) are connected in series between the outputs of the first inverter circuit INV1. Among the primary side coils, the primary side coils belonging to a different transformer (LpC, LpF) are connected in series between the outputs of the second inverter circuit INV2. Among the primary side coils, the primary side coils belonging to a different transformer (LpE, LpB) are connected in series between the outputs of the third inverter circuit INV3.

In this case also, in cases where the capacities of the plurality of capacitors Ci1, Ci2, and Ci3 provided on the input side of each inverter circuit vary, the voltages across the two terminals of these capacitors are balanced and the output stabilizes.

Figure 12:
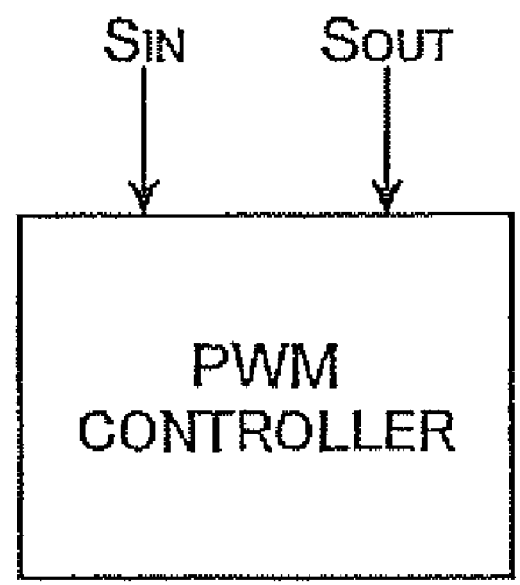
FIG. 12 is a block diagram of a PWM (pulse wave modulation) controller 100 that is applied to the switching power supply.

FIG. 12 is a block diagram of a PWM (pulse wave modulation) controller 100 that is applied to the switching power supply.

The PWM controller 100 generates an output signal $S_{OUT}$ in accordance with an input signal $S_{IN}$. The output voltage of the switching power supply at the node A and the output voltage from the current transformer L1 can be used as the input signal $S_{IN}$. The output signal $S_{OUT}$ is an ON/OFF control signal of the switches Q1, Q2, Q3, and Q4. In cases where the output voltage of the switching power supply is increased, the current is reduced by reducing the duty ratio of the switching pulse signal contained in the output signal $S_{OUT}$ and, in cases where the output voltage of the switching power supply is reduced, the current is increased by increasing the duty ratio of the switching pulse signal. Control is performed similarly also in cases where the voltage output by the current transformer L1 drops or increases excessively.

As mentioned hereinabove, the switching power supply 10 shown in FIGS. 1, 3, and 4 comprises a plurality of transformers 1 and 2 which each contain a core portion, a plurality of inverter circuits INV1 and INV2 which drive the primary side coils Lp1 to Lp4 of the transformers 1 and 2, a plurality of center tap rectifier circuits (rectifier circuit 3a) connected to the secondary side coils Ls1 to Ls4 of the transformer, and a plurality of smoothing circuits 3b established in parallel which are connected downstream of the plurality of center tap rectifier circuits.

In addition, the switching power supplies 10 shown in FIGS. 10 and 11 likewise comprise a plurality of transformers 101, 102, and 103 each comprising a core portion, a plurality of inverter circuits INV1 to INV3 which drive the primary side coils LpA to LpF of the transformers 101, 102, and 103, a plurality of center tap rectifier circuits (rectifier circuit 3a) connected to the secondary side coils LsA to LsF of the transformers, and a plurality of smoothing circuits 3b established in parallel which are connected downstream of the plurality of center tap rectifier circuits.

In addition, in the switching power supply 10 shown in FIGS. 1, 3, and 4, at least pairs of secondary side coils (Ls1, Ls4), (Ls2, Ls3) are connected to the respective center tap rectifier circuits and the secondary side coils of each center tap rectifier circuit are disposed in the core portions (cores CR1 and CR2) of mutually different transformers 1 and 2.

Furthermore, likewise, in the switching power supply 10 shown in FIGS. 10 and 11, at least pairs of secondary side coils (LsA, LsF), (LsB, LsC), and (LsD, LsE) are connected to the respective center tap rectifier circuits and the secondary side coils of each center tap rectifier circuit are disposed in the core portions (cores CR1, CR2, and CR3) of the mutually different transformers 101, 102, and 103.

In the case of the switching power supply 10 above, even in a case where the characteristics of the smoothing circuits 3b downstream of the respective center tap rectifier circuits are each different from one another, the output of one of the secondary side coils provided in each of the different transformers can be input to each of the smoothing circuits established in parallel downstream in a certain period, and the output of the other secondary side coil provided in each of the different transformers can be input to each smoothing circuit established in parallel downstream in the next period, thereby both can be output together. The characteristics of the outputs of the smoothing circuits and transformers are equalized and the outputs stabilized.

Let us suppose that each smoothing circuit comprises at least a choke coil and there are also a plurality of smoothing circuits which also comprise a common capacitor.

As mentioned earlier, the respective smoothing circuits of the switching power supplies 10 shown in FIGS. 1, 3, and 4 comprise a plurality of choke coils Lch1 and Lch2 which are each connected to the outputs of the respective center tap rectifier circuits and the capacitor Cout is connected downstream of the choke coils Lch1 and Lch2. The outputs of the respective center tap rectifier circuits are input to the choke coils Lch1 and Lch2 connected in the center tap position.

Furthermore, the respective smoothing circuits of the switching power supplies 10 shown in FIGS. 10 and 11 likewise comprise a plurality of choke coils LchA, LchB, and LchC which are each connected to the outputs of the respective center tap rectifier circuits and the capacitor Cout is connected downstream of the choke coils LchA, LchB, and LchC. The outputs of the respective center tap rectifier circuits are input to the choke coils LchA, LchB, and LchC connected in the center tap position.

In cases where the characteristics of the inductances of these choke coils and so forth differ, the output of one of the secondary side coils provided in each of the different transformers can be input to each of the downstream choke coils in a certain period, and the output of the other secondary side coil provided in each of the different transformers can be input to each of the downstream choke coils in the next period, thereby both can be output together. The characteristics of the inductances of each of the choke coils Lch1 and Lch2 shown in FIGS. 1 to 4 or of each of the choke coils LchA, LchB, and LchC shown in FIGS. 10 and 11 are equalized and the outputs stabilized.

In cases where the number of transformers is four, these transformers can be provided as two sets of two transformers or the constitution can be such that all four transformers have secondary side coils looped thereabout as mentioned earlier. For example, in a case where there are five transformers, the transformers can be provided with two transformers in a set and three transformers provided in one set respectively, or the constitution can be such that secondary side coils can be looped around all five transformers. Various constitutions can be adopted and the number of transformers which can be applied in the present invention is not limited to the embodiments hereinabove or to those mentioned earlier.

In addition, in the switching power supplies with the connective relationships shown in FIGS. 1 and 3, at least pairs of primary side coils (Lp1, Lp2), (Lp3, Lp4) are connected in series to the respective inverter circuits INV1 and INV2 and the primary side coils (Lp1, Lp2), (Lp3, Lp4) of each of the inverter circuits INV1 and INV2 are disposed in the core portions of the mutually different transformers 1 and 2.

In addition, in the switching power supplies with the connective relationships shown in FIGS. 10 and 11, at least pairs of primary side coils (LpA, LpD), (LpC, LpF), and (LpE, LpB) are serially connected to the respective inverter circuits INV1, INV2, and INV3 and the primary side coils (LpA, LpD), (LpC, LpF), and (LpE, LpB) of each of the inverter circuits INV1, INV2, and INV3 are disposed in the core portion of the mutually different transformers 101, 102, and 103.

In the case of this constitution, in cases where the downstream smoothing circuit characteristics, that is, the values of the choke coils are different, the potentials at the connection points of the primary side coils fluctuate and the induced voltages of the secondary side coils accordingly fluctuate, and the current flowing to each choke coil finally equalize. In other words, currents flowing to each choke coil are balanced and the outputs stabilize even in cases where there are manufacturing errors and assembly errors with the inductances of the choke coils.

The switching power supply above is a DC-DC converter but an input signal may also be input by performing full-wave rectification on a low frequency on the order of 50 Hz, for example, and an AC component can also be output by suitably adjusting the duty ratio of the switching pulse signal.

In each embodiment, although the capacitors Cout of the smoothing circuits are combined as one overall capacitor Cout, capacitors Cout may also be provided in correspondence with each of the choke coils.

In the above circuit, although the transfer of power from the DC power supply Vin side to the load Z via the inverter circuits INV1 and INV2 is performed, this can also be performed by replacing the load Z with the second power supply and transferring power in the reverse direction from the second power supply Z to the DC power supply Vin. That is, the switching power supply is also capable of performing a two-way power transfer. This two-way power transmission technology is useful as the elemental technology of a hybrid automobile or an electric automobile or the like.

In particular, a switching power supply capable of performing two-way power transmission can be applied, in an electronic device which comprises a dual-channel secondary cell, to power control or the like in which, in cases where a need for charging is generated in the secondary cell of the first channel, power is supplied from the secondary cell of the other channel.

Figure 13:
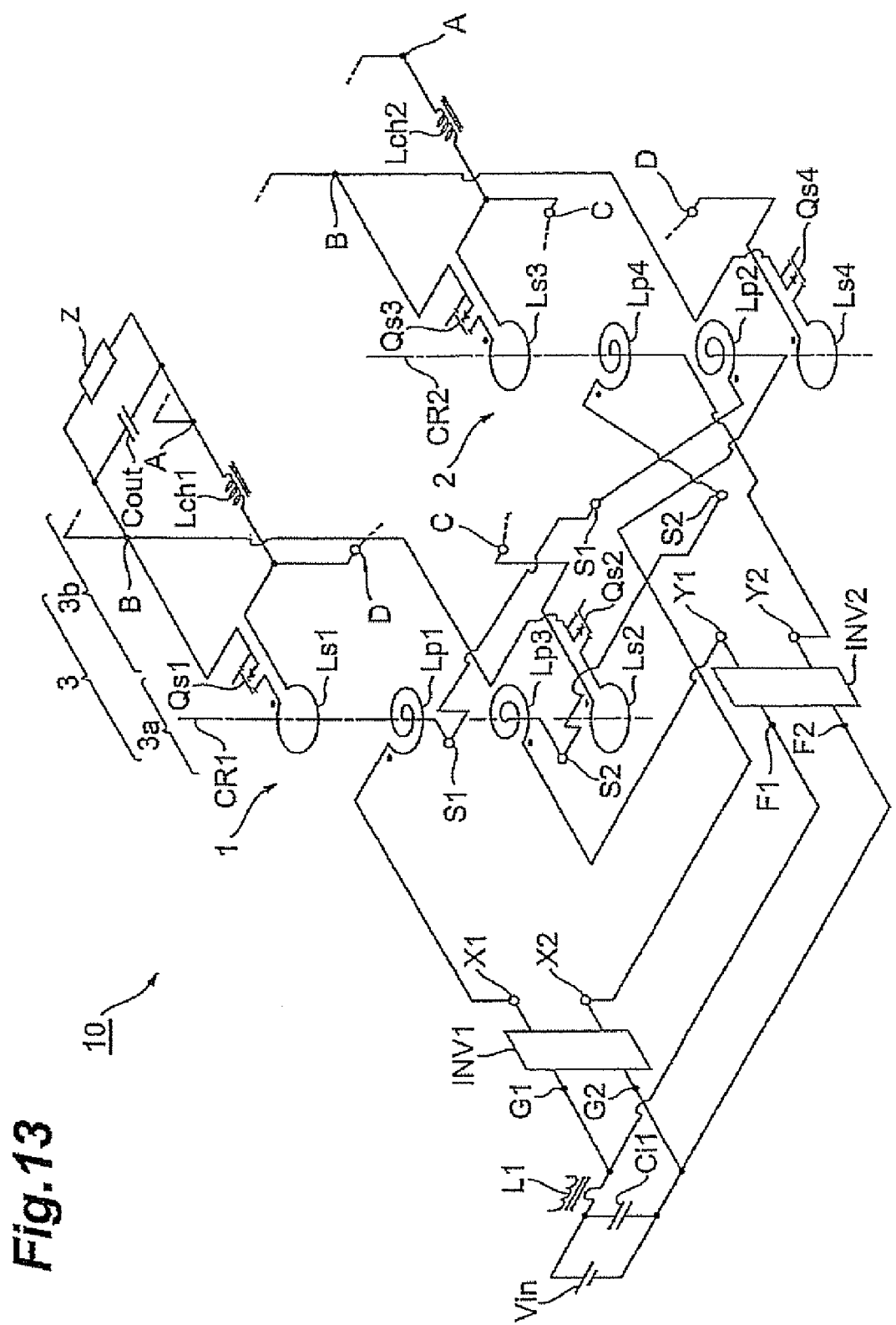
FIG. 13 is a circuit diagram of a switching power supply to illustrate reverse power transmission.

FIG. 13 is a circuit diagram of a switching power supply to illustrate reverse power transmission.

This switching power supply is, in principle, the same as the switching power supply of the first embodiment shown in FIG. 1 and is obtained by replacing the diodes Ds1, Ds2, Ds3, and Ds4 of the rectifier circuits shown in FIG. 1 with the transistors Qs1, Qs2, Qs3, and Qs4. Here, power transmission from the DC power supply Vin to the load Z in a case where Z is the load is forward power transmission and power transmission from the second load Z to the DC power supply Vin in the case where the load Z is replaced with the second power supply is reverse power transmission. In the case of forward power transmission, the power is transmitted from the capacitor Ci1 to the capacitor Cout and, in the case of reverse power transmission, power is transmitted from the capacitor Cout to the capacitor Ci1.

The transistors Qs1, Qs2, Qs3, and Qs4 comprise field effect transistors (FET) but can also be constituted by insulated-gate bipolar transistors (IGBT).

In the case of forward power transmission, in cases where the transistors Qs1, Qs2, Qs3, and Qs4 are constituted by normal FET, the gate voltage of the respective transistors Qs1, Qs2, Qs3, and Qs4 may be increased to a value equal or greater than a threshold value only in a period in which a forward current is flowing in the diodes Ds1, Ds2, Ds3, and Ds4 shown in FIG. 1 so as to fulfill a function equivalent to the diodes. Such synchronized rectification which employs MOSFETs or the like has the advantage of generating a smaller loss than diode rectification. Alternatively, in cases where the transistors Qs1, Qs2, Qs3, and Qs4 are constituted by normal FET, a PN junction comprising a source region and a semiconductor substrate of different conductivity types can also be utilized to fulfill a function equivalent to that of the diodes Ds1, Ds2, Ds3, and Ds4. In cases where the transistors Qs1, Qs2, Qs3, and Qs4 are constituted by IGBT, diodes connected in parallel so that the anodes are connected to the emitters of the respective bipolar transistors and the cathodes are connected to the collectors are utilized so that the diodes connected in parallel with the transistors Qs1, Qs2, Qs3, and Qs4 respectively can be made to function as the diodes Ds1, Ds2, Ds3, and Ds4.

The remaining action of the forward power transmission is the same as that of the embodiment above.

However, in the case of reverse power transmission, the transistors Qs1, Qs2, Qs3, and Qs4 are made to function as switching elements. Where the power transmission is concerned, the functions of the primary side coils and secondary side coils are switched and the functions of the rectifier circuits and switching circuits are switched.

Figure 14:
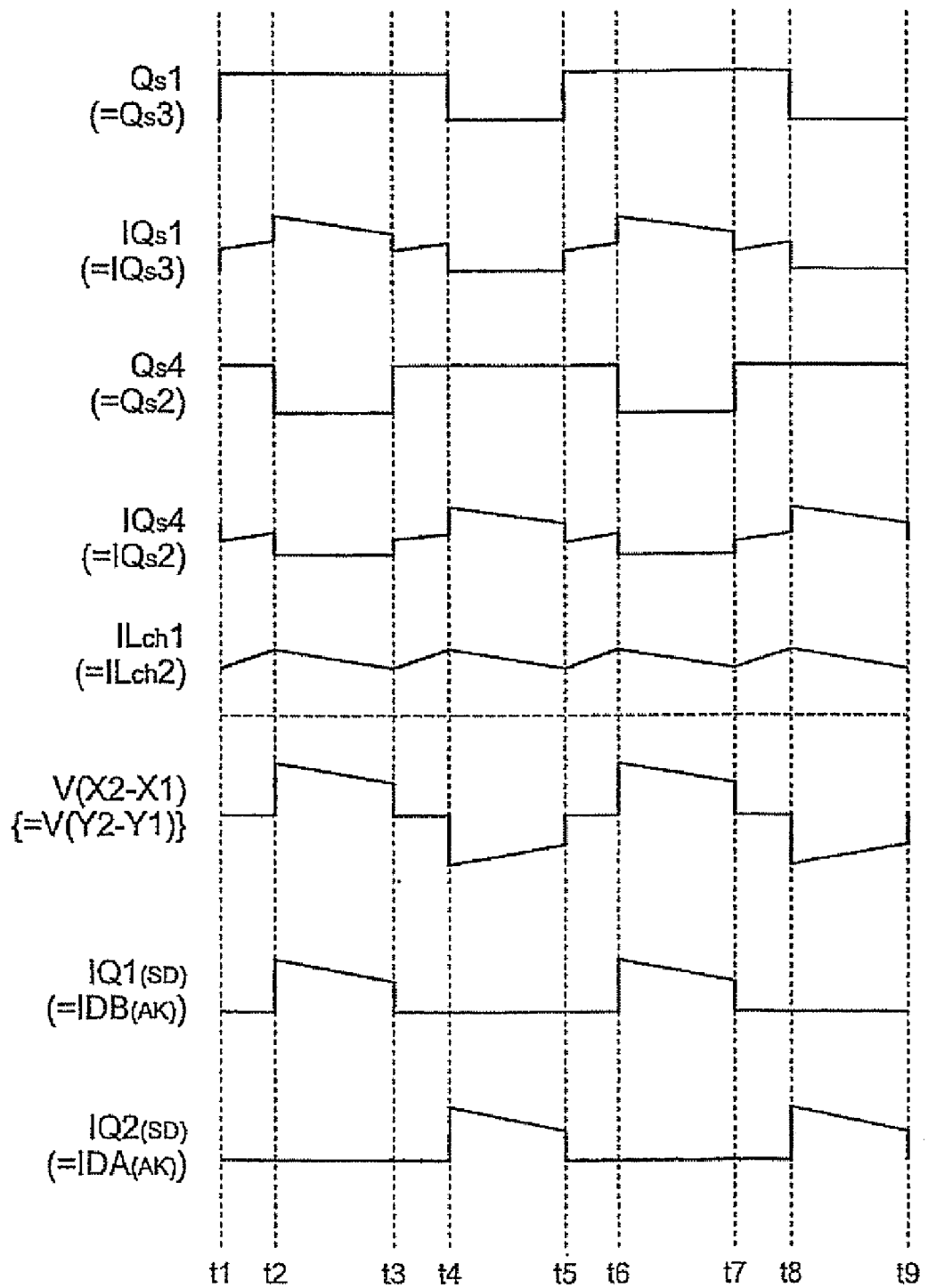
FIG. 14 is a timing chart to illustrate reverse power transmission.

FIG. 14 is a timing chart to illustrate reverse power transmission.

In cases where Z is the second power supply, the transistors Qs1 and Qs3 have synchronized switching timing and currents IQs1 and IQs3 flow to each of the transistors Qs1 and Qs3 respectively in accordance with the switching. In addition, the transistors Qs4 and Qs2 have synchronized switching timing and currents IQs4 and IQs2 flow to each of the transistors Qs4 and Qs2 respectively in accordance with this switching.

From time t1 to time t2, each of the transistors Qs1, Qs2, Qs3, and Qs4 are turned ON so that current flows to these transistors and currents ILch1 and ILch2 in the choke coils Lch1 and Lch2 start to increase.

From time t2 to time t3, transistors Qs4 and Qs2 turn OFF and currents IQs4 and IQs2 flowing thereto decrease (time t2). However, because the fluctuations in the total current amount are suppressed, the currents IQs1 and IQs3 flowing in the transistors Qs1 and Qs3 increase (time t2), whereupon the currents IQs1 and IQs3 flowing to the transistors Qs1 and Qs3 respectively gradually decrease in accordance with the reduction in the current flowing in the choke coils Lch1 and Lch2.

From time t3 to time t4, the transistors Qs4 and Qs2 turn ON once again and, while the currents IQs4 and IQs2 flowing to these transistors increase, the currents IQs1 and IQs3 flowing in the transistors Qs1 and Qs3 decrease (time t3), whereupon the currents IQs1 IQs3, IQs4, and IQs2 flowing to each of the transistors Qs1, Qs3, Qs4, and Qs2 gradually increase in accordance with the increase in the current flowing in the choke coils Lch1 and Lch2.

From time t4 to time t5, the transistors Qs1 and Qs3 turn OFF and the currents IQs1 and IQs3 flowing thereto decrease (time t4). However, because the fluctuations in the total current amount are suppressed, the currents IQs4 and IQs2 flowing in the transistors Qs4 and Qs2 increase (time t4), whereupon the currents IQs4 and IQs2 flowing to the transistors Qs4 and Qs2 respectively gradually decrease in accordance with the reduction in the current flowing in the choke coils Lch1 and Lch2.

The circuit operation from time t5 to time t6 is the same as the operation from time t1 to time t2. The circuit operation from time t6 to time t7 is the same as the operation from time t2 to time t3. The circuit operation from time t7 to time t8 is the same as the operation from time t3 to time t4. The circuit operation from time t8 to time t9 is the same as the operation from time t4 to time t5.

In cases where IQs1 is flowing, current flows to the coil Ls1 and, in cases where IQs3 is flowing, current flows to coil Ls3. In cases where IQs4 is flowing, current flows to coil Ls4 and, in cases where IQs2 is flowing, current flows to coil Ls2.

In other words, in the period (T1) from time t1 to time t4, while current is flowing to the coils Ls1 and Ls3, current hardly flows to coils Ls4 and Ls2. Furthermore, in the period (T2) from time t3 to time t6, while current is flowing to the coils the Ls4 and Ls2, current hardly flows to coils Ls1 and Ls3. Periods T1 and T2 partially overlap and a slight current flows in all of the coils Ls1 to Ls4 from time t1 to time t2, time t3 to time t4, and time t5 to time t6.

In the middle period t2 to t3 of period T1, current flows adequately to coils Ls1 and Ls3 and current does not flow to coils Ls4 and Ls2. In the periods t1 to t2 and t3 to t4 at both ends of period T1, a slight current flows to the coils Ls1 and Ls3. In other words, in period T1, current, which is in sync with the currents IQs1 and IQs3, flows to coils Lp1 and Lp3 which are magnetically coupled to coils Ls1 and Ls3 respectively. That is, at time T1, coils Lp1 and Lp3 are the current sources. A potential difference (V(X2−X1)) is generated between the terminals X2 and X1 connected to the coil Lp1 and a potential difference (V(Y2−Y1)) is generated between the terminals Y2 and Y1 connected to the coil Lp3. A charging current thus flows from terminal X2 to terminal X1 and a charging current flows from terminal Y2 to terminal Y1. The inverter circuits INV1 and INV2 function as rectifier circuits and, if these charging currents are transmitted to the DC power supply Vin, the DC power supply Vin is charged by these charging currents.

Likewise, in the middle period t4 to t5 of the period T2, current flows adequately to the coils Ls4 and Ls2 and current does not flow to the coils Ls1 and Ls3. In the periods t3 to t4 and t5 to t6 at the two ends of period T2, a slight current flows to the coils Ls4 and Ls2. That is, in the period T2, a current which is in sync with the currents IQs4 and IQs2 thus flows to the coils Lp4 and Lp2 which are magnetically coupled to the coils Ls4 and Ls2. In other words, in period T2, the coils Lp4 and Lp2 are current sources. A potential difference (V(X2−X1)) is generated between the terminals X2 and X1 connected to the coil Lp2 and a potential difference (V(Y2−Y1)) is generated between the terminals Y2 and Y1 connected to the coil Lp4. A charging current thus flows from the terminal X2 to the terminal X1 and a charging current flows from the terminal Y2 to the terminal Y1. The inverter circuits INV1 and INV2 function as rectifier circuits and, if these charging currents are transmitted to the DC power supply Vin, the DC power supply Vin is charged by these charging currents.

FIGS. 2A and 2B show the circuit constitutions of the inverter circuits INV1 and INV2 but function as rectifier circuits.

A current $IDB_{(AK)}$ flows across the anode/cathode of the diodes DB of both of the inverter INV1 and INV2 from time t2 to t3 in sync with the potential difference (V(X2−X1) or (V(Y2−Y1)) and a current $IQ1_{(SD)}$ flows across the source/drain of the transistor IQ1 and the inverter circuit functions as a rectifier circuit.

A current $IDA_{(AK)}$ flows across the anode/cathode of the diodes DA of both of the inverters INV1 and INV2 from time t4 to t5 in sync with the potential difference (V(X2−X1) or (V(Y2−Y1)) and a current $IQ2_{(SD)}$ flows across the source/drain of the transistor IQ1 and the inverter circuit functions as a rectifier circuit.

In cases where the switches Q1 to Q4 constituting the inverters INV1 and INV2 in FIGS. 2A and 2B are made to function as rectifier circuits, the parasitic diodes (body diodes) of the transistors constituting the switches Q1 to Q4 respectively can also be used as rectification elements. In the case of reverse power transmission, in cases where the switches Q1 to Q4 are constituted by normal FET, the switches Q1 to Q4 perform switching to fulfill a function equivalent to that of the rectifier diodes or parasitic diodes (body diodes) belonging to the FET of the switches Q1 to Q4 are made to function as rectifier diodes.

In cases where diodes DA and DB do not exist, naturally, same may exist but, in such a case, when the switches Q2 and Q3 are made to fulfill a rectifying action in the case of reverse power transmission, the current flowing from terminal X1 to the resonance inductor LR reaches the capacitor Ci1 or DC power supply Vin via the switch Q3 and then returns to the terminal X2 via the switch Q2. Only in the period in which current flows from the terminal X1, the switches Q3 and Q2 are ON or not depending on whether the gate voltage of is equal to or greater than a threshold value, meaning that current flows in a forward direction in the parasitic diodes. During this period, switches Q1 and Q4 are OFF. In cases where the diode DA exists, a forward current flows to the diode DA from the terminal X1 and therefore switch Q3 may be in an OFF state.

Furthermore, conversely, in the case of reverse power transmission, when the switches Q1 and Q4 are made to fulfill a rectifying action, current flowing from the terminal X2 to the switch Q1 reaches the capacitor Ci1 or DC power supply Vin, whereupon the current returns to the terminal X1 via the switch Q4. Only in the period in which current flows from the terminal X2, the switches Q1 and Q4 are ON or not depending on whether the gate voltage of is equal to or greater than a threshold value, meaning that current flows in a forward direction in the parasitic diodes. During this period, switches Q2 and Q3 are OFF. In cases where the diode DB exists, a forward current flows to the diode DB from the terminal X1 and therefore switch Q4 may be in an OFF state.

In addition, during the rectifying action in the case of reverse power transmission, in cases where the transistors Q1 to Q4 are constituted by IGBT, diodes connected in parallel so that the anodes are connected to the emitters of the respective bipolar transistors and the cathodes are connected to the collectors are utilized so that the diodes connected in parallel with the transistors Q1 to Q4 respectively can also be made to function such that the currents are rectified as above.

As mentioned hereinabove, in the example shown in FIGS. 13 and 14, the rectifying elements (diodes) constituting the center tap rectifier circuits comprise the transistors Qs1, Qs2, Qs3, and Qs4 and the rectifier circuits are made to function as inverter circuits performing a synchronized rectifying operation by driving the switching of the transistors and the power transmission can also be performed in the reverse direction via the rectifier circuit from the power supply Z provided downstream of the rectifier circuit. Two-way power transmission is accordingly possible. Furthermore, in the case of reverse power transmission, the DC power supply V can be replaced with a load. In addition, a two-way power transmission constitution can also be applied to the switching power supply of the other embodiments.

What is claimed is:

1. A switching power supply, comprising:
a plurality of transformers each having a core portion;
a plurality of inverter circuits that drive primary side coils of the transformers;
a plurality of center tap rectifier circuits connected to secondary side coils of the transformers; and
a plurality of smoothing circuits which are connected downstream of the plurality of center tap rectifier circuits,
wherein at least a pair of secondary side coils are connected to each of the center tap rectifier circuits, and
each secondary side coil of the pair of secondary side coils of each of the center tap rectifier circuits are disposed in core portions of mutually different transformers.

2. The switching power supply according to claim 1, wherein the plurality of transformers comprise first and second transformers,
the plurality of center tap rectifier circuits comprise first and second center tap rectifier circuits,
one of the secondary side coils connected to the first center tap rectifier circuit is disposed in the core portion of the first transformer and the other secondary side coil is disposed in the core portion of the second transformer, and
one of the secondary side coils connected to the second center tap rectifier circuit is disposed in the core portion of the first transformer and the other secondary side coil is disposed in the core portion of the second transformer.

3. The switching power supply according to claim 1, wherein the plurality of transformers comprise m transformers, where m is an integer of three or more,
the plurality of center tap rectifier circuits comprise m center tap rectifier circuits, and
one of the secondary side coils connected to an nth center tap rectifier circuit is disposed in the core portion of the nth transformer, where n is an integer satisfying $2 \leq n \leq m$, the other secondary side coil is disposed in the core portion of the (n-1)th transformer, and the other of the secondary side coils connected to the first center tap rectifier circuit is disposed in the core portion of an mth transformer.

4. The switching power supply according to claim 1, wherein at least a pair of primary side coils are connected in series to each of the inverter circuits and the primary side coils of each of the inverter circuits are disposed in core portions of mutually different transformers.

5. The switching power supply according to claim 1, wherein a plurality of primary side coils connected between output terminals of each of the inverter circuits are connected in series, and
the primary side coils of each of the inverter circuits are magnetically coupled to the plurality of secondary side coils so that the AC resistances of the primary side coils become high alternately while the inverter circuits are driven.

6. The switching power supply according to claim 1, wherein rectifying elements constituting the rectifier circuits comprise transistors and the rectifier circuits are made to function as inverter circuits by driving the switching of the transistors, and power is transmitted in the reverse direction via the rectifier circuits from a power supply provided downstream of the rectifier circuits.

* * * * *